United States Patent
Saminda De Silva et al.

(10) Patent No.: US 7,313,666 B1
(45) Date of Patent: Dec. 25, 2007

(54) METHODS AND APPARATUS FOR LONGEST COMMON PREFIX BASED CACHING

(75) Inventors: Suran Saminda De Silva, Cupertino, CA (US); Rina Panigrahy, Sunnyvale, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1061 days.

(21) Appl. No.: 10/328,639

(22) Filed: Dec. 24, 2002

Related U.S. Application Data

(63) Continuation-in-part of application No. 10/215,697, filed on Aug. 10, 2002.

(51) Int. Cl.
*G06F 12/00* (2006.01)
*G06F 15/173* (2006.01)
(52) U.S. Cl. .................... 711/173; 711/108; 709/238
(58) Field of Classification Search ............... 709/238; 711/108, 173
See application file for complete search history.

(56) References Cited

U.S. PATENT DOCUMENTS

| | | |
|---|---|---|
| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,319,763 A | 6/1994 | Ho et al. |
| 5,339,076 A | 8/1994 | Jiang |
| 5,383,146 A | 1/1995 | Threewitt |
| 5,404,482 A | 4/1995 | Stamm et al. |
| 5,428,565 A | 6/1995 | Shaw |
| 5,440,715 A | 8/1995 | Wyland |
| 5,450,351 A | 9/1995 | Heddes |
| 5,481,540 A | 1/1996 | Huang |
| 5,515,370 A | 5/1996 | Rau |
| 5,528,701 A | 6/1996 | Aref |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Jack Lane
(74) *Attorney, Agent, or Firm*—The Law Office of Kirk D. Williams

(57) ABSTRACT

Methods and apparatus are disclosed for longest common prefix based caching. An information space is partitioned into multiple subsets such that a particular subset including a particular prefix also includes all longer prefixes beginning with the particular prefix in the information space. A primary control unit typically maintains the information space and all of the subsets, and selectively distributes some or all of the subsets to basic control units, and each of basic control units does not necessarily receive the same group of subsets. In addition, the group of subsets maintained by a particular basic control unit may change during operation, typically to increase the likelihood that a particular basic control unit will contain the needed subset. When a particular basic control unit does not have the needed subset, it typically sends to the primary control unit, a request for a lookup result, for the primary control unit to process the packet or other information, or for the primary control unit to send the corresponding subset.

24 Claims, 19 Drawing Sheets

U.S. PATENT DOCUMENTS

| | | |
|---|---|---|
| 5,651,099 A | 7/1997 | Konsella |
| 5,684,954 A | 11/1997 | Kaiserswerth et al. |
| 5,721,889 A | 2/1998 | Namba |
| 5,740,171 A | 4/1998 | Mazzola et al. |
| 5,781,772 A | 7/1998 | Wilkinson, III et al. |
| 5,802,567 A | 9/1998 | Liu et al. |
| 5,809,501 A | 9/1998 | Noven |
| 5,829,004 A | 10/1998 | Au |
| 5,841,874 A | 11/1998 | Kempke et al. |
| 5,842,040 A | 11/1998 | Hughes et al. |
| 5,848,416 A | 12/1998 | Tikkanen |
| 5,852,569 A | 12/1998 | Srinivasan et al. |
| 5,884,297 A | 3/1999 | Noven |
| 5,898,689 A | 4/1999 | Kumar et al. |
| 5,920,886 A | 7/1999 | Feldmeier |
| 5,930,359 A | 7/1999 | Kempke et al. |
| 5,956,336 A | 9/1999 | Loschke et al. |
| 5,978,885 A | 11/1999 | Clark, II |
| 6,000,008 A | 12/1999 | Simcoe |
| 6,018,524 A | 1/2000 | Turner et al. |
| 6,041,389 A | 3/2000 | Rao |
| 6,047,369 A | 4/2000 | Colwell et al. |
| 6,061,368 A | 5/2000 | Hitzelberger |
| 6,067,574 A | 5/2000 | Tzeng |
| 6,069,573 A | 5/2000 | Clark, II et al. |
| 6,081,440 A | 6/2000 | Washburn et al. |
| 6,091,725 A | 7/2000 | Cheriton et al. |
| 6,097,724 A | 8/2000 | Kartalopoulos |
| 6,115,716 A | 9/2000 | Tikkanen et al. |
| 6,134,135 A | 10/2000 | Andersson |
| 6,137,707 A | 10/2000 | Srinivasan et al. |
| 6,141,738 A | 10/2000 | Munter et al. |
| 6,148,364 A | 11/2000 | Srinivasan et al. |
| 6,154,384 A | 11/2000 | Nataraj et al. |
| 6,175,513 B1 | 1/2001 | Khanna |
| 6,181,698 B1 | 1/2001 | Hariguchi |
| 6,199,140 B1 | 3/2001 | Srinivasan et al. |
| 6,219,748 B1 | 4/2001 | Srinivasan et al. |
| 6,236,658 B1 | 5/2001 | Essbaum et al. |
| 6,237,061 B1 | 5/2001 | Srinivasan et al. |
| 6,240,003 B1 | 5/2001 | McElroy |
| 6,240,485 B1 | 5/2001 | Srinivasan et al. |
| 6,243,667 B1 | 6/2001 | Kerr et al. |
| 6,246,601 B1 | 6/2001 | Pereira |
| 6,285,378 B1 | 9/2001 | Duluk, Jr. |
| 6,289,414 B1 | 9/2001 | Feldmeier et al. |
| 6,295,576 B1 | 9/2001 | Ogura et al. |
| 6,298,339 B1 | 10/2001 | Bjornson |
| 6,307,855 B1 | 10/2001 | Hariguchi |
| 6,308,219 B1 | 10/2001 | Hughes |
| 6,374,326 B1 | 4/2002 | Kansal et al. |
| 6,377,577 B1 | 4/2002 | Bechtolsheim et al. |
| 6,389,506 B1 | 5/2002 | Ross et al. |
| 6,430,190 B1 | 8/2002 | Essbaum et al. |
| 6,434,662 B1 | 8/2002 | Greene et al. |
| 6,526,474 B1 | 2/2003 | Ross |
| 6,535,951 B1 | 3/2003 | Ross |
| 6,542,391 B2 | 4/2003 | Pereira et al. |
| 6,563,823 B1 * | 5/2003 | Przygienda et al. ........ 370/392 |
| 6,633,548 B2 | 10/2003 | Bachmutsky et al. |
| 6,763,426 B1 | 7/2004 | James et al. |
| 6,831,850 B2 | 12/2004 | Pereira et al. |
| 6,963,924 B1 * | 11/2005 | Huang et al. ............... 709/238 |
| 7,114,026 B1 | 9/2006 | Khanna |
| 2002/0131432 A1 | 9/2002 | Bachmutsky et al. |
| 2003/0005146 A1 | 1/2003 | Miller et al. |
| 2003/0093616 A1 | 5/2003 | Slavin |
| 2004/0015752 A1 | 1/2004 | Patella et al. |
| 2004/0100950 A1 | 5/2004 | Basu et al. |
| 2004/0105422 A1 * | 6/2004 | Sahni et al. ................ 370/351 |
| 2005/0262295 A1 | 11/2005 | Nataraj et al. |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressabnle Memory)?," Application Brief AB-N6, Rev. 2a, Music Semiconductors, Milpitas, CA, Sep. 30, 1998, 4 pages.

"Reading Out the Valic LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "Patricia—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM SIGMETRICS Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification,"

Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998, ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

* cited by examiner

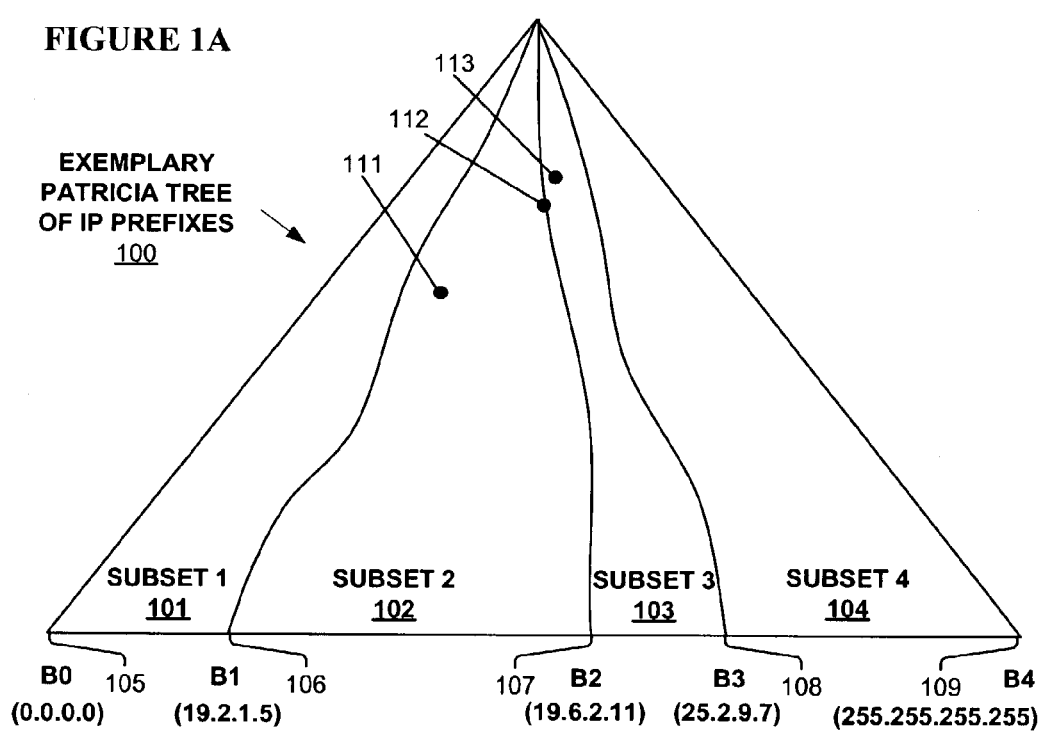

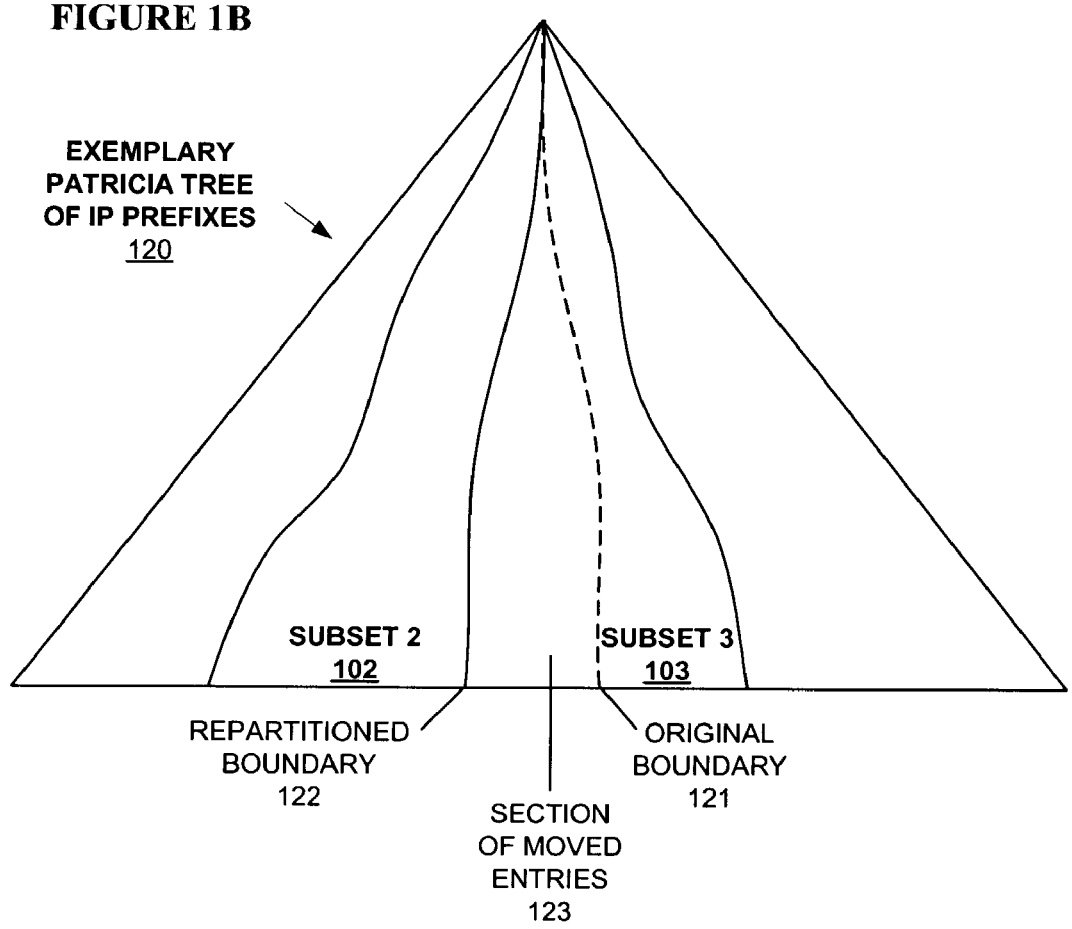

METHODS AND APPARATUS FOR LONGEST COMMON PREFIX BASED CACHING

CROSS-REFERENCE TO RELATED APPLICATIONS

This is a continuation-in-part of application Ser. No. 10/215,697, filed Aug. 10, 2002, and is hereby incorporated by reference.

FIELD OF THE INVENTION

This invention especially relates to computer and communications systems, especially network routers and switches; and more particularly, the invention relates to deriving subsets of a routing or other information space such that for a particular prefix in a particular subset, the particular subset includes all longer prefixes beginning with the particular prefix in the routing or other information space. These subsets can then be distributed among basic control units (e.g., line cards of a router) for use in performing a longest prefix match on a particular result, or communicating with a primary control unit if the corresponding subset is not in the basic control unit.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Packet forwarding decisions and other packet operations are demanding parts of switch and router design. For example, IP forwarding requires a longest prefix match. In order to support large number of layer 3 prefixes (e.g., IP, IPX), four to eight ternary content-addressable memory (TCAM) chips are often used due to the number of addresses that need to be supported. A longest prefix match is determined by performing a lookup operation on each of the TCAM chips. However, CAMs and TCAMs are expensive in terms of financial cost, power consumption and heat dissipation, and thus desired are new methods and apparatus for performing lookup operations.

Certain routers or other switching systems use a distributed routing technique in which line cards store routing information and are attached to an interconnection network for communicating packets between line cards. In a known system, each line card stores the full routing space, which typically requires several TCAMs. In another known system, a line card does not maintain the full routing space, but rather caches a few last used fully expanded addresses (e.g., no prefixes), and if the desired address does not exactly match the lookup value (e.g., destination address), a lookup request is forwarded to a supervisor card which performs the routing lookup operation and returns a routing response based on which the packet is routed by the line card. However, this caching is limited to fully expanded addresses as a routing lookup operation requires the result to be guaranteed to be that of a longest prefix match. By storing only fully expanded addresses, the search guarantees this, but it also causes many routing lookup operation misses causing a large number of routing requests to be sent to a supervisor line card which maintains the full routing space. Needed are new ways to more efficiently determine routing information.

SUMMARY OF THE INVENTION

Methods and apparatus are disclosed for longest common prefix based caching. In one embodiment, an information space is partitioned into multiple subsets such that a particular subset including a particular prefix also includes all longer prefixes beginning with the particular prefix in the information space. A primary control unit typically maintains the information space and all of the subsets, and selectively distributes some or all of the subsets to basic control units, and each of basic control units does not necessarily receive the same group of subsets. In addition, the group of subsets maintained by a particular basic control unit may change during operation, typically to increase the likelihood that a particular basic control unit will contain the needed subset. When a particular basic control unit does not have the needed subset, it may send a request to the primary control unit. In one embodiment, in response to the request, the primary control unit performs a lookup operation on the information space and returns a lookup result to the requesting basic control unit. In one embodiment, in response to the request, the primary control unit performs a lookup operation on the information space and processes a corresponding item (e.g., packet or other information) based the lookup result. In one embodiment, in response to the request, the primary control unit updates the requesting basic control unit with the corresponding subset, and the basic control unit may supplement its data structure of subsets with this subset or replace another subset with this subset.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 1A-B are block diagrams of a mechanism used in one embodiment for partitioning and repartitioning the space of possible entries;

DETAILED DESCRIPTION

Figure 1C:
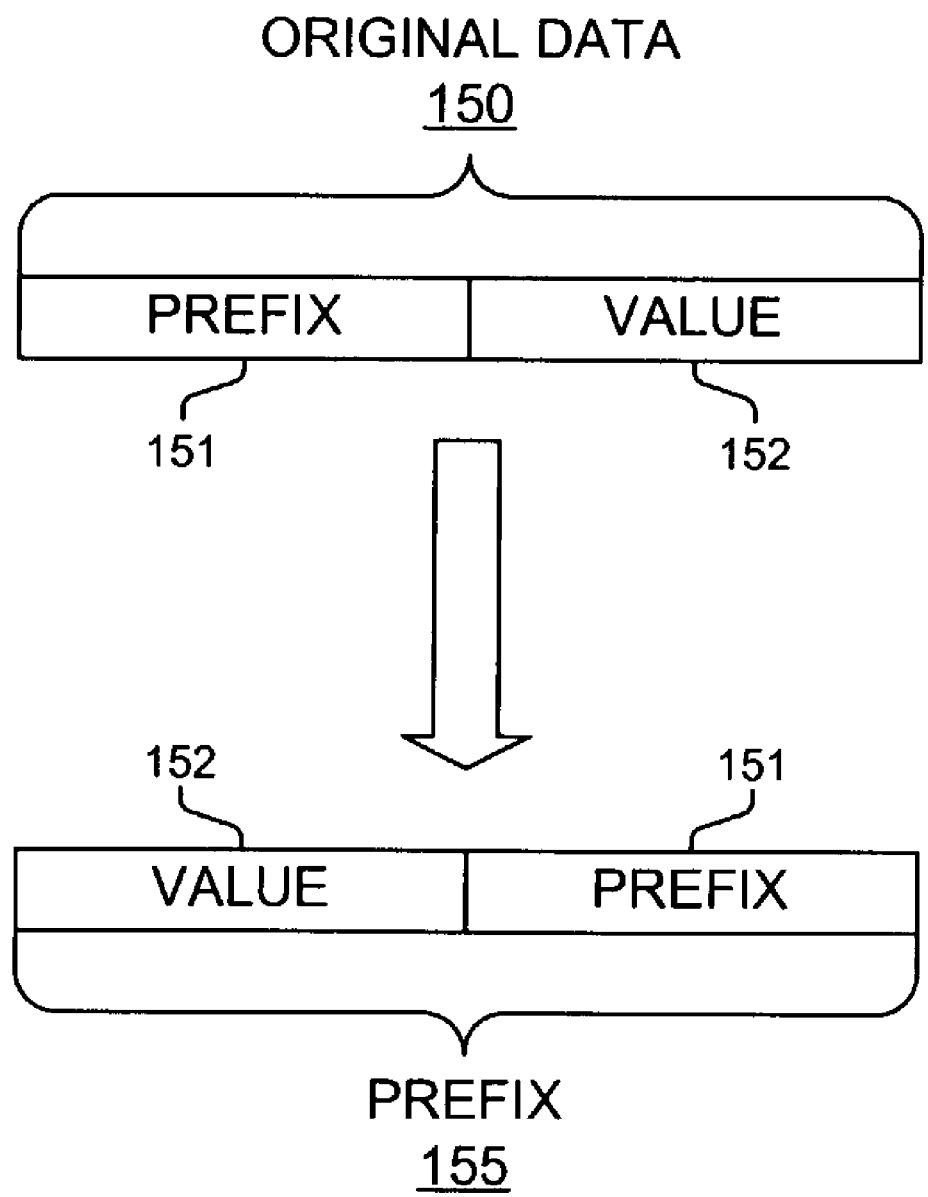
FIG. 1C is a block diagram of a mechanism for mapping a prefix and a value into a prefix for programming in the partitioned space of one embodiment.

Systems and methods are disclosed for longest common prefix based caching. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc. The term "lookup unit" is an extensible term which may include any mechanism for performing a lookup operation, such as, but not limited to an associative memory unit, custom circuitry, a RAM-based solution, a lookup control and memory device, etc. The term "associative memory unit" is an extensible term, and may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for longest common prefix based caching. An information space is partitioned into multiple subsets such that a particular subset including a particular prefix also includes all longer prefixes beginning with the particular prefix in the information space. A primary control unit typically maintains the information space and all of the subsets, and selectively distributes some or all of the subsets to basic control units, and each of basic control units does not necessarily receive the same group of subsets. In addition, the group of subsets maintained by a particular basic control unit may change during operation, typically to increase the likelihood that a particular basic control unit will contain the needed subset. When a particular basic control unit does not have the needed subset, it typically sends to the primary control unit, a request for a lookup result, for the primary control unit to process the packet or other information, or for the primary control unit to send the corresponding subset.

Thus, a lookup operation on a value in a lookup unit will either generate a miss (e.g., no match within a locally stored prefix subsets) or a match on a subset. Because of the way the information space is partitioned such that all longer prefixes of a given prefix are in a subset, then a matching subset will have the longest matching prefix, which will be identified by the lookup operation on the matching subset.

In one embodiment, each of the lookup units is assigned a subset of the possible values of the entries and is programmed with the corresponding entries. In one embodiment, a lookup operation is then performed in the enabled lookup unit or units based on the lookup word to generate the lookup result. Each of the lookup units may correspond to any mechanism for performing a lookup operation, such as, but not limited to an associative memory unit (e.g., one or more associative memories, associative memory banks, and/or sets of entries within one or more associative memory devices or banks), custom circuitry, a RAM-based solution, a lookup control and memory device, etc. In one embodiment, the enabling processes is hierarchical. For example, one of multiple lookup units within a single lookup unit within a set of lookup units is enabled. In one embodiment, the partitioning of elements is based on a Patricia tree representation of the possible entries.

In one embodiment, the entire Patricia tree is divided into 1024 regions. At any time, sixteen subsets of regions are present in the local forwarding table in a lookup unit. Each subset typically contains one or more contiguous regions. In one embodiment, sixteen regions are determined based on statistics for each local forwarding table, and the regions are optionally adjusted (e.g., shrunk, expanded, moved, etc.) as the statistics or QoS guarantees change.

In one embodiment, the subsets that are cached in a lookup unit are determined based on QoS guarantees/reservations, recent traffic patterns, randomly selected, and/or using any other methodology. For example, in one embodiment, the subsets that correspond to addresses which can receive most of the traffic from the lookup unit are preferentially maintained in the lookup unit. In one embodiment, the subsets maintained in a lookup unit are determined by maintaining statistics of the destination IP addresses, and those that are most often and/or most recently used are preferably maintained in the lookup unit.

In performing a lookup operation on a lookup word in one embodiment, only the lookup units possibly containing a matching entry are enabled which saves power and dissipates less heat. For example, the power consumption of one embodiment of a lookup engine built with TCAMs approximates that of a conventional SRAM-based lookup engine. Also, one embodiment requires approximately two to three watts of power to operate per TCAM, wherein a similar configuration using the conventional technique of searching all TCAM entries requires approximately fourteen watts of power per TCAM. For example, one embodiment partitions the information space in a manner described herein, and distributes these subsets to the basic control units typically in a manner commiserate with traffic patterns so as to increase the likelihood that a basic control unit will have the subset(s) that it typically requires. Additionally, one embodiment uses this partitioning for selectively enabling less than all of the multiple lookup units in a supervisor control unit and/or in one or more of the basic control units when performing a lookup operation.

Turning now to the figures, FIGS. 1A-B are block diagrams of a mechanism used in one embodiment for partitioning and repartitioning the space of possible entries using a Patricia tree. Turning to FIG. 1A, illustrated is an exemplary Patricia tree of Internet Protocol (IP) prefixes 100. In this example, the space of the Patricia tree is partitioned into four subsets 101-104, with boundary points 105-109. Note, although four subsets of the information space are shown in this example, the number of subsets used is extensible and can vary among embodiments and applications thereof. For example, one embodiment uses 128 subsets; while one embodiment uses thirty-two subsets.

Three entries 111-113 are shown. Entry 111 resides in subset 2 (102). Entry 113 resides in subset 3 (103). Entry 112 lies on the boundary between subsets 2 and 3 (102-103) and therefore resides in both of these subsets 102-103.

In one embodiment, a prefix P* falls in a range [a, b] if the range [P0 . . . 0, P1 . . . 1] intersects with the range [a, b]. Some prefixes can fall into multiple ranges. For example, the prefix **** falls in all ranges. However the number of such prefixes will be few, with the exact number being a function of the width of an lookup unit entry and the number of partitions. In one embodiment, the number of prefixes is at most a product of the width of an lookup unit entry and the number of common boundaries (e.g., the number of partitions minus one.) One mechanism to determine if a prefix P* falls only in a single range [a, b] is to check a <P0 . . . 0, P1 . . . 1<b This will ensure that P* can not fall into any other range, because the ranges are disjoint.

In one embodiment, the ranges in such a way that about an equal number of prefixes fall into each partition, with each partitioning of prefixes being placed in a different lookup unit. Those entries that are in multiple partitions will be placed in a corresponding number of lookup units. In one embodiment, such as the partitioning the entries using a Patricia tree as illustrated in FIG. 1A, any prefix that falls into multiple ranges must be on the path from one of these boundaries to the root. Otherwise, it will strictly lie in the interior of one of the regions carved out by these paths (e.g., boundaries). In other words, if a prefix p does not lie on any boundary, then there is some partition that p is "strictly to the right of" the boundary path from the endpoint of the boundary to root and/or "strictly to the left of" an adjoining boundary path from its endpoint to the root.

During updates, the boundaries can be moved to adjust the number of entries programmed into each lookup units, such as if one of the lookup units is becoming full, the number of entries in each partition or subset varies too greatly, or even to redistribute entries based on traffic patterns, etc. As shown in FIG. 1B, the position of original boundary 121 of exemplary Patricia tree of Internet Protocol (IP) prefixes 120 is moved to the repartitioned boundary 122, and any entries in section 123 are moved from subset 2 (102) to subset 3 (103).

In one embodiment, a number of entries in the lookup unit for each partition are reserved for entries that possibly would fall on a boundary of the partition. During an insert operation, if the entry to be inserted falls on a boundary of a partition, then it is added to each of the corresponding lookup units. If it does not fall on a boundary and there is a free entry position, the new entry is added to the corresponding lookup unit. If there is no free entry (or a threshold number of entries has been exceeded in one embodiment), then the boundary is shifted.

In one embodiment, this shifting of the boundaries between partitions is accomplished as follows. A neighboring boundary B, say to the right of the partition corresponding to the entry to be added, is identified. Let P be the first prefix strictly to the left of boundary path from B to root (ordering of prefixes is defined to be the "post-order" traversal of the Patricia tree). Set new boundary B' to be equal to P1 . . . 1. Now we have reduced the number of internal prefixes in the lookup unit by at least one. All prefixes on B' to root are then inserted into the adjacent lookup unit.

In one embodiment, this shifting of the boundaries between partitions is accomplished as follows. There are two nodes N1 and N2 on the tree and the boundary consists of paths between N1 to root and N2 to root. There is at least one node between N1 and N2 in the Patricia tree which has a value the width of an lookup unit entry (e.g., the node is not a prefix). It is this value that determines the new position of the boundary, and is programmed in the mechanism for generating the enable signals. In one embodiment, the number of prefixes between N1 and N2 is at most sixty-four for width of sizes thirty-two, and therefore, 128 entries are reserved for the boundary prefixes, with some of these being virtual. The lookup units corresponding to the partitions on either side of the new boundary are required to keep prefixes on the new boundary. Thus, if an entry is to be inserted corresponds to a boundary, then it is added to the corresponding lookup unit. Otherwise, if there are free entries or there are entries outside the boundaries, then the entry is added to the corresponding lookup unit. Otherwise, boundaries are shifted to make room for the entry.

In one embodiment, one boundary (N1, N2) either to the right (or left) is identified. The first prefix P strictly to the left (right) of the boundary is then identified. N1 is set to P and N2 is set to the value of the first prefix to the left (right) of the old value of N2. P is then inserted into the corresponding lookup unit, and thus, the number of internal prefixes in the lookup unit in which to add the new entry has been decreased by at least one. The endpoint of the new boundary B' is then equal to some full-width number (e.g., not a prefix) between N1 and N2, and is programmed in the mechanism for generating the enable signals.

Another advantage derived in one embodiment by maintaining prefixes rather than merely maintaining fully expanded addresses is that prefixes can sometimes be combined or consolidated to reduce the overall number of entries that must be maintained. For example, it might be possible to combine two entries into a single entry that encompasses both entries. For example, an address of 10.0.0.1 and 10.0.0.2 might be able to be combined into a single address of 10.0.0.0/24.

As described, some partitioning mechanisms operate using prefixes, such as that illustrated in one embodiment using a Patricia tree. However, not all entries are necessarily a prefix, or are typically defined by a prefix followed by a number, which is not a prefix. FIG. 1C illustrates a mechanism for mapping a prefix and a value into a prefix for programming in the partitioned space of one embodiment. As shown, original data 150 contains a prefix 151 followed by a value 152. By adjusting the ordering of prefix 151 and value 152, a prefix 155 can be created by concatenating value 152 with prefix 151.

This mechanism is especially useful where the lookup is not a simple longest prefix match. For example, in case of virtual private network (VPN) routing, the lookup unit entries corresponding to route entries could be both [VPN, IP prefix] and [*, IP prefix]. Similarly, in the case of IP multicast lookup, the lookup unit entries could be both [IP multicast group G, source IP prefix] and [*, source IP prefix].

The fields of these non-prefix values could then be reordered to produce prefixes, with these prefixes used to populate lookup units as described herein. In one embodiment, two sets of lookup units are used (e.g., with each set typically being partitioned as described herein.) The first set of lookup units is programmed with entries corresponding to [VPN, IP prefix], which are basically prefixes. The second set of lookup units is programmed with entries corresponding to [IP prefix, *], which is obtained by writing the fields in reverse order. In performing a lookup operation, a lookup is performed in both sets of lookup units, with the best matching entry being identified.

Figure 2A:
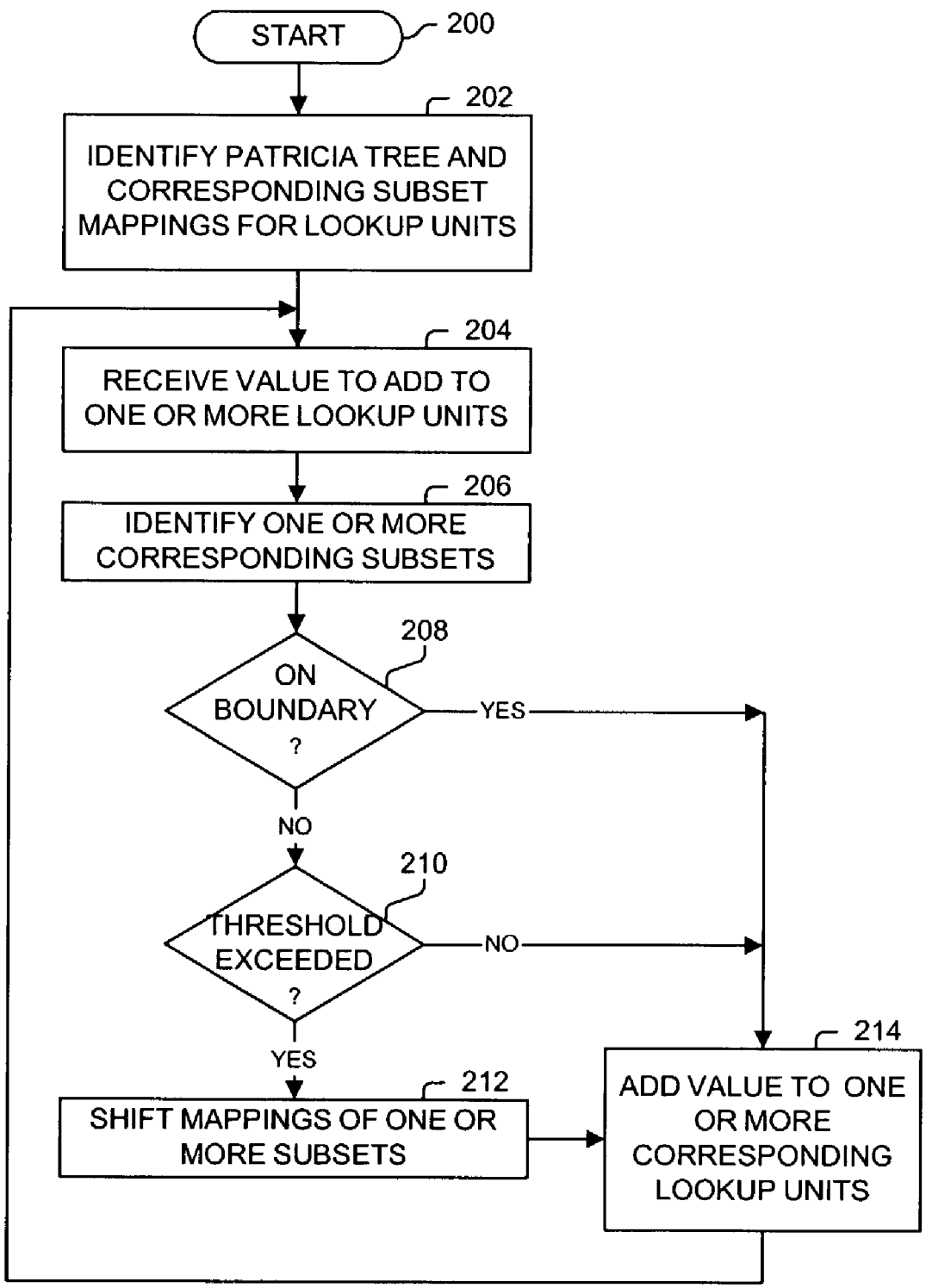
FIGS. 2A-B illustrate processes used in one embodiment for partitioning and repartitioning entries among lookup units.

FIG. 2A illustrates a process used in one embodiment for partitioning and repartitioning entries among lookup units. Processing begins with process block 200, and proceeds to process block 202, wherein a Patricia tree and corresponding subset mappings (i.e., partitions) are identified for each of the lookup units. Next, in process block 204, a value to add to lookup units is received, and in process block 206, its corresponding partition or partitions are identified. As determined in process block 208, if the entry to add does not fall on a boundary, then as determined in process block 210, if a threshold is exceeded (e.g., the occupancy of the corresponding partition is too great—such as there being no free entries), then in process block 212, the mappings of one or more subsets are shifted using any technique, such as those described herein, including, but not limited to that described in relation to FIGS. 1B and 2B. In process block 214, the value is then added to one or more of the corresponding lookup units. Processing then returns to process block 204.

Figure 2B:
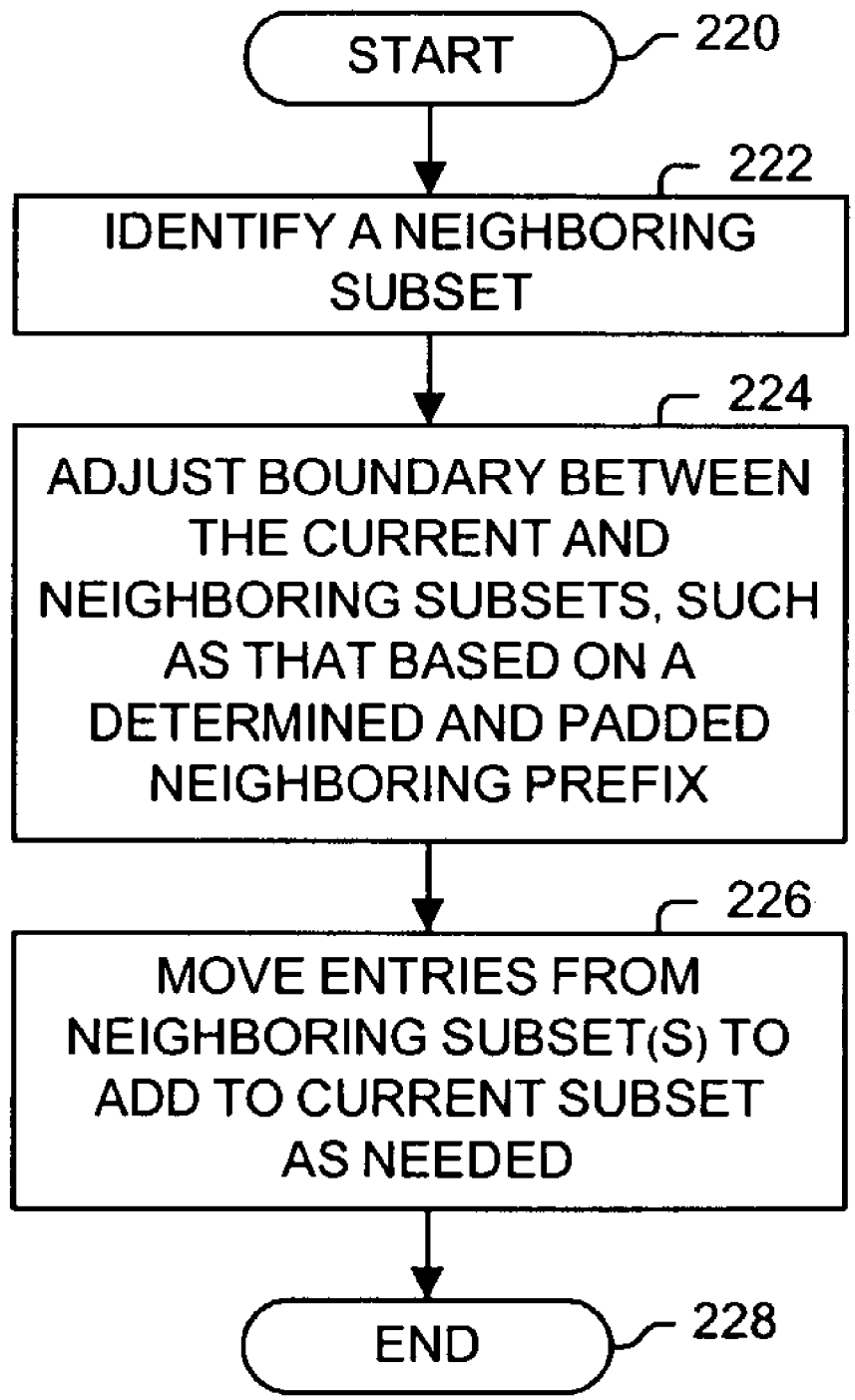

FIG. 2B illustrates a process used in one embodiment to shift the boundaries of neighboring subsets (partitions). Processing begins with process block 220, and proceeds to process block 222, wherein a neighboring subset is identified. Next, in process block 224, the boundary between the current and neighboring subset is adjusted, including, but not limited to that based on a determined and padded neighboring prefix as described herein. In process block 226, as required, entries are moved from the neighboring subset or subsets to the current subset and/or added to the current subset as needed. This task may include moving entries between/among multiple subsets to obtain an entry from a subset that has a free entry. Processing is complete as indicated by process block 228.

Figure 3A:
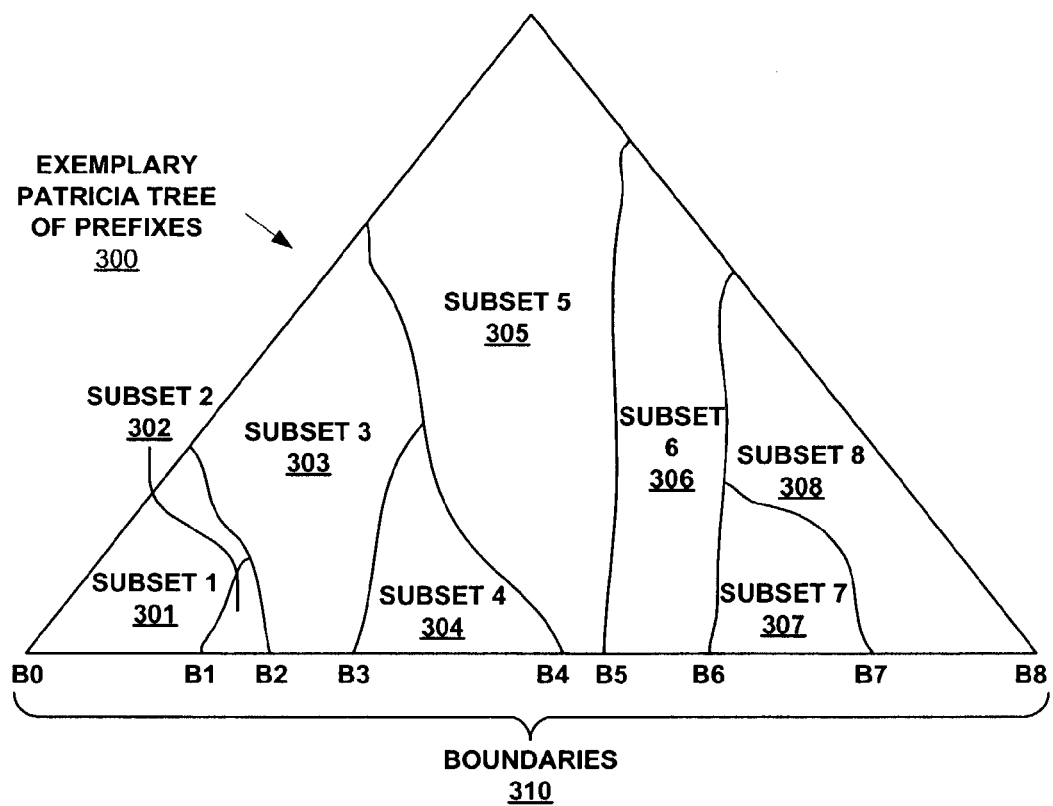
FIGS. 3A-D are block diagrams illustrating an exemplary partitioning of prefixes and its storage in a supervisor data structure and the storage of subsets thereof in data structures of basic control units.

FIGS. 3A-D are block diagrams illustrating an exemplary partitioning of prefixes and its storage in a supervisor data structure and the storage of subsets thereof in data structures of basic control units. Turning first to FIG. 3A, illustrated is an example Patricia Tree of prefixes 300 (i.e., the information or routing space), which has been partitioned into eight subsets 301-308, having boundaries 310.

Figure 3B:
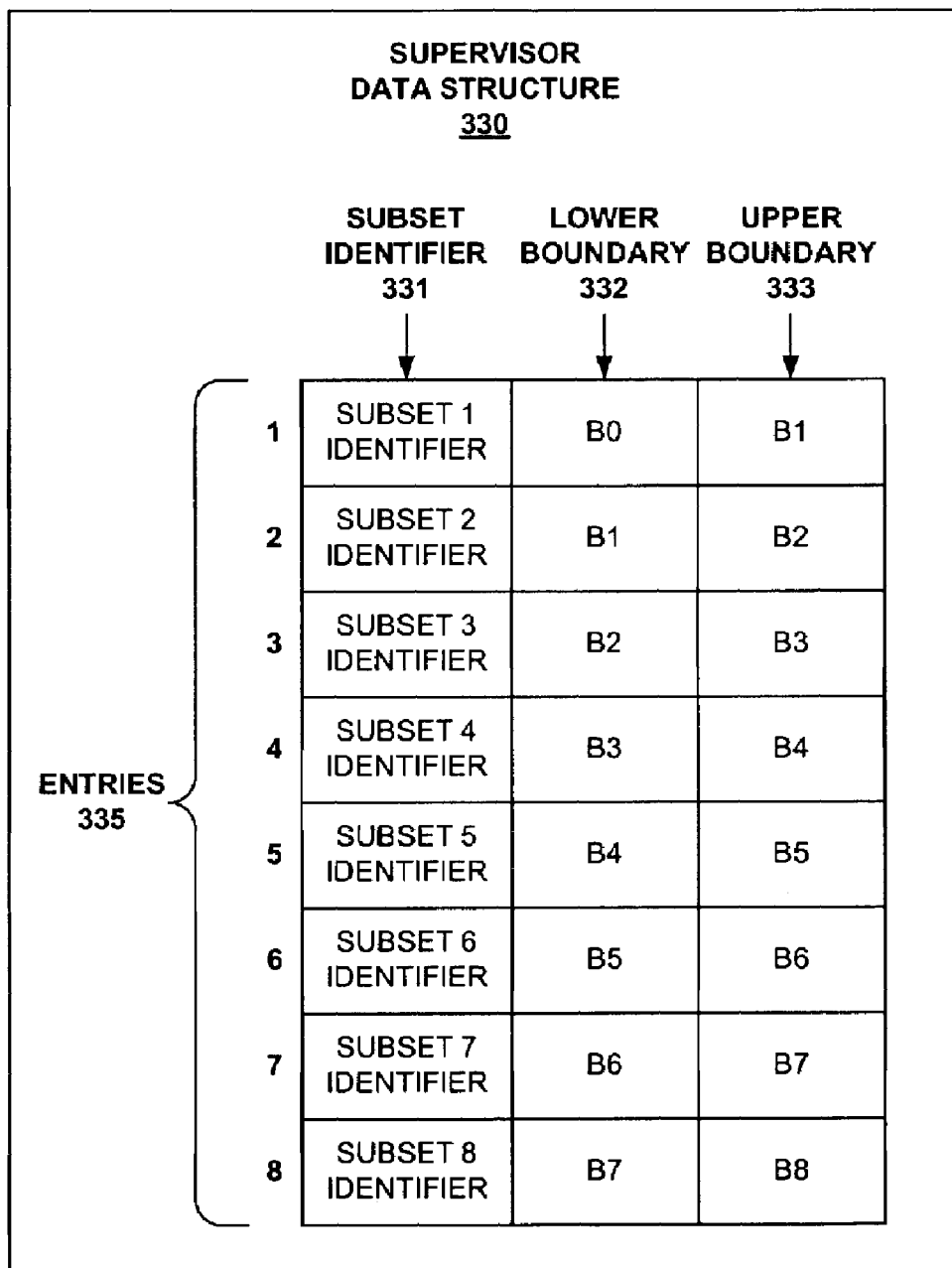

FIG. 3B illustrates an exemplary supervisor data structure 330 used in one embodiment. Data structure 330 includes entries 335, typically one for each subset 301-308 (FIG. 3A). As shown, each of the entries 335 includes a subset identifier field 331, a lower boundary value field 332, and an upper boundary value field 333. The values in entries 335 correspond to subsets 301-308. In one embodiment, entries 335 do not include a subset identifier field 331 as the identifier used corresponds to a particular entry's position in data structure 330.

Note, it is sufficient to compare an input value to the lower and upper boundary values to determine a matching subset, if any, because of the manner in which the subsets are partitioned (i.e., such that a particular subset including a particular prefix also includes all longer prefixes beginning with the particular prefix in the information space). Thus, the longest prefix matching the input value would either be in the corresponding subset (i.e., region) or on the boundary to the root of the Patricia tree.

Figure 3C:
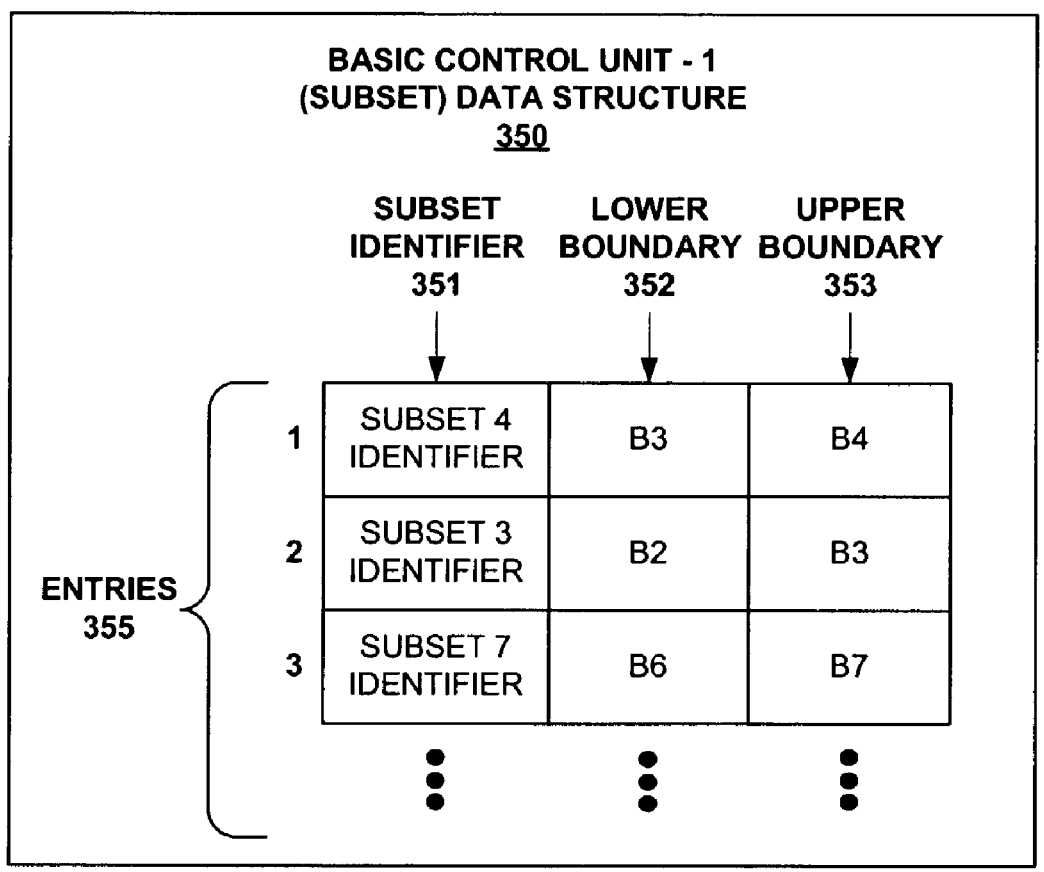

FIG. 3C illustrates an exemplary data structure 350 maintained by a first basic control unit. Data structure 350 includes entries 355, the number of which may vary among basic control units, and may depend on available memory or other considerations. As shown, each of the entries 355 includes a subset identifier field 351, a lower boundary value field 352, and an upper boundary value field 353. In this example, the first basic control unit includes entries for subsets 304, 303, and 307 (FIG. 3A).

Figure 3D:
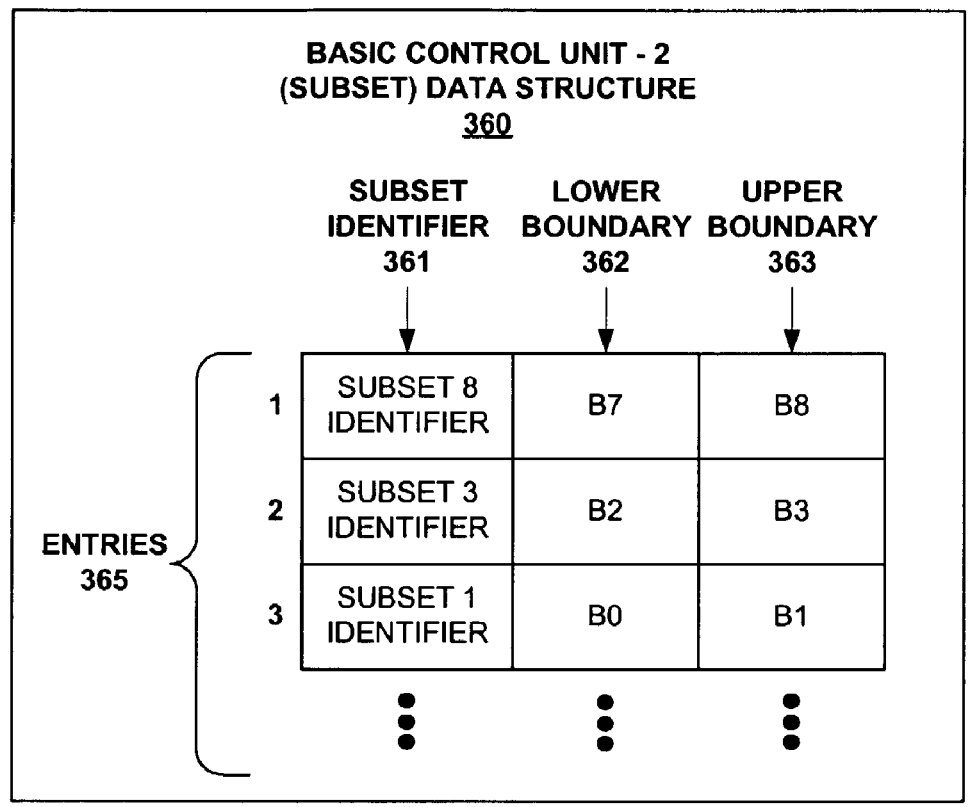

FIG. 3D illustrates a data structure 360 maintained by a first basic control unit. Data structure 360 includes entries 365, the number of which may vary among basic control units, and may depend on available memory or other considerations. As shown, each of the entries 365 includes a subset identifier field 361, a lower boundary value field 362, and an upper boundary value field 363. In this example, the first basic control unit includes entries for subsets 308, 303, and 301 (FIG. 3A). Note, that in this example, supervisor data structure 330 contains entries for all subsets 301-308 (FIG. 3B), while basic control unit-1 data structure 350 (FIG. 3C) and basic control unit-2 data structure 360 (FIG. 3D) contain different groups of subsets, and typically, but not required, less than all of the subsets.

Figure 4A:
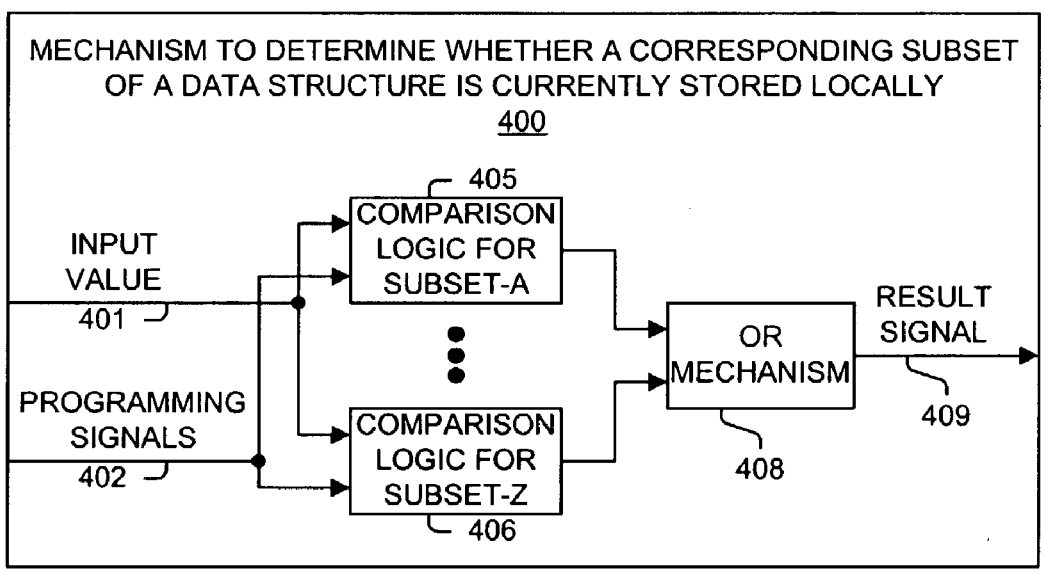
FIG. 4A is a block diagram of a mechanism used in one embodiment to determine if the required subset of the full prefix data structure is locally stored.

FIG. 4A is a block diagram of a mechanism 450 used in one embodiment to determine if the required subset of the full prefix data structure is locally stored or stored within a particular lookup unit (e.g., for selectively enabling). Mechanism 400 is programmed via programming signals 402 to program comparison logic units 405-406, each typically with a lower and an upper boundary pair for a different subset. Comparison logic units 405-406 generate a result signal provided to OR mechanism 408, which generates result signal 409. Thus, based on an input value 401, comparison logic units 405-406 will determine whether input value 401 falls within its corresponding range, and result signal 409 will indicate whether input value 401 matched at least one of the programmed ranges.

Figure 4B:
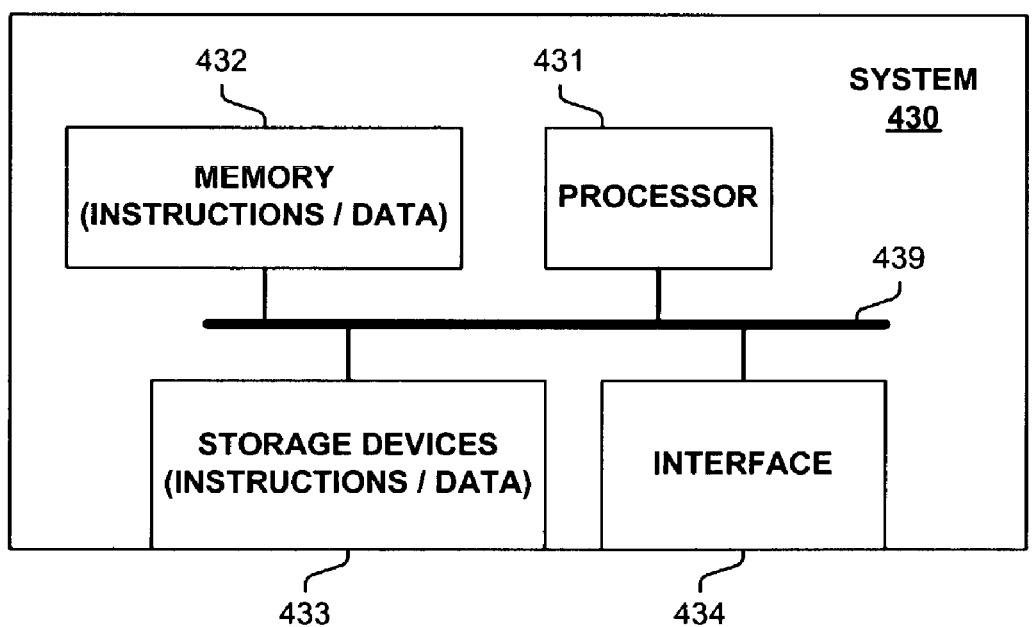
FIG. 4B is a block diagram of one embodiment of a system using longest common prefix matching.

FIG. 4B is a block diagram of one embodiment of a system 430 using longest common prefix matching. In one embodiment, system 430 maintains and performs processing based on all subsets of an information space. In one embodiment, system 430 maintains and performs processing on less than all subsets of an information space, and may send requests to another system for handling items corresponding to subsets not currently locally maintained.

In one embodiment, system 430 includes a processing element 431, memory 432, storage devices 433, and one or more interfaces 434 for communicating among elements, other components, and/or external devices. Processing element 431, memory 432, storage devices 433, and one or more interfaces 434 are typically coupled via one or more communications mechanisms 439 (shown as a bus for illustrative purposes). Various embodiments of system 430 may include more or less elements. The operation of system 430 is typically controlled by processing element 431 using memory 432 and storage devices 433 to perform one or more tasks or processes. Memory 432 is one type of computer-readable medium, and typically comprises random access memory (RAM), read only memory (ROM), flash memory, integrated circuits, and/or other memory components. Memory 432 typically stores computer-executable instructions to be executed by processing element 431 and/or data which is manipulated by processing element 431 for implementing functionality in accordance with the invention.

Storage devices 433 are another type of computer-readable medium, and typically comprise solid state storage media, disk drives, diskettes, networked services, tape drives, and other storage devices. Storage devices 433 typically store computer-executable instructions to be executed by processing element 431 and/or data which is manipulated by processing element 431 for implementing functionality in accordance with the invention.

Figure 5:
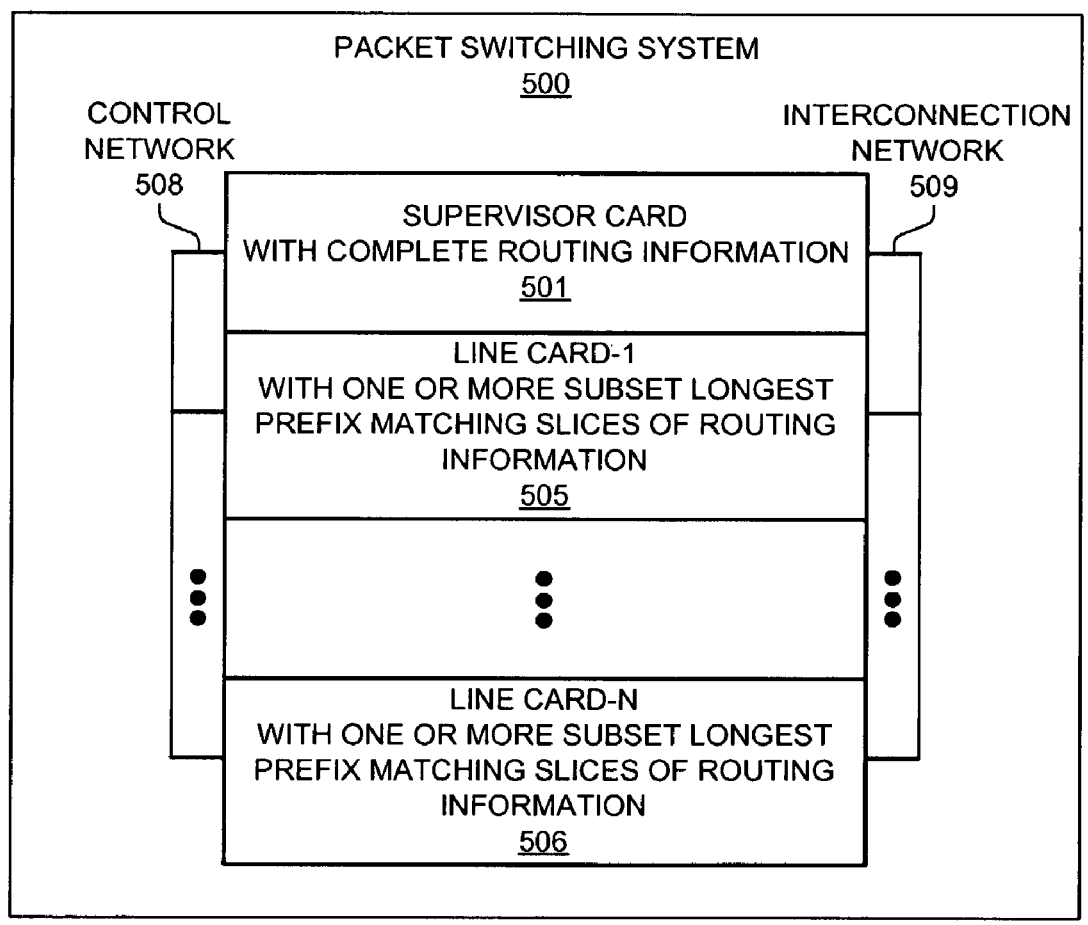
FIG. 5 is a block diagram of a packet switching system that typically distributes subsets of a routing of other information space with each subset including the longest prefix match of each of its entries to basic control units.

FIG. 5 illustrates a packet switching system 500 that typically distributes subsets of a routing of other information space with each subset including the longest prefix match of each of its entries to basic control units. Packet switching system 500 includes a supervisor card 501 which typically maintains the entire routing space, and is coupled to one or more line cards 505-506 which maintain subsets of the routing space. Control network 508 is used in one embodiment to communicate routing subsets and routing requests and responses between supervisor card 501 and line cards 505-506. Interconnection network 509 is used to interconnect line cards 501-506 and over which, packets are typically communicated.

Figure 6A:
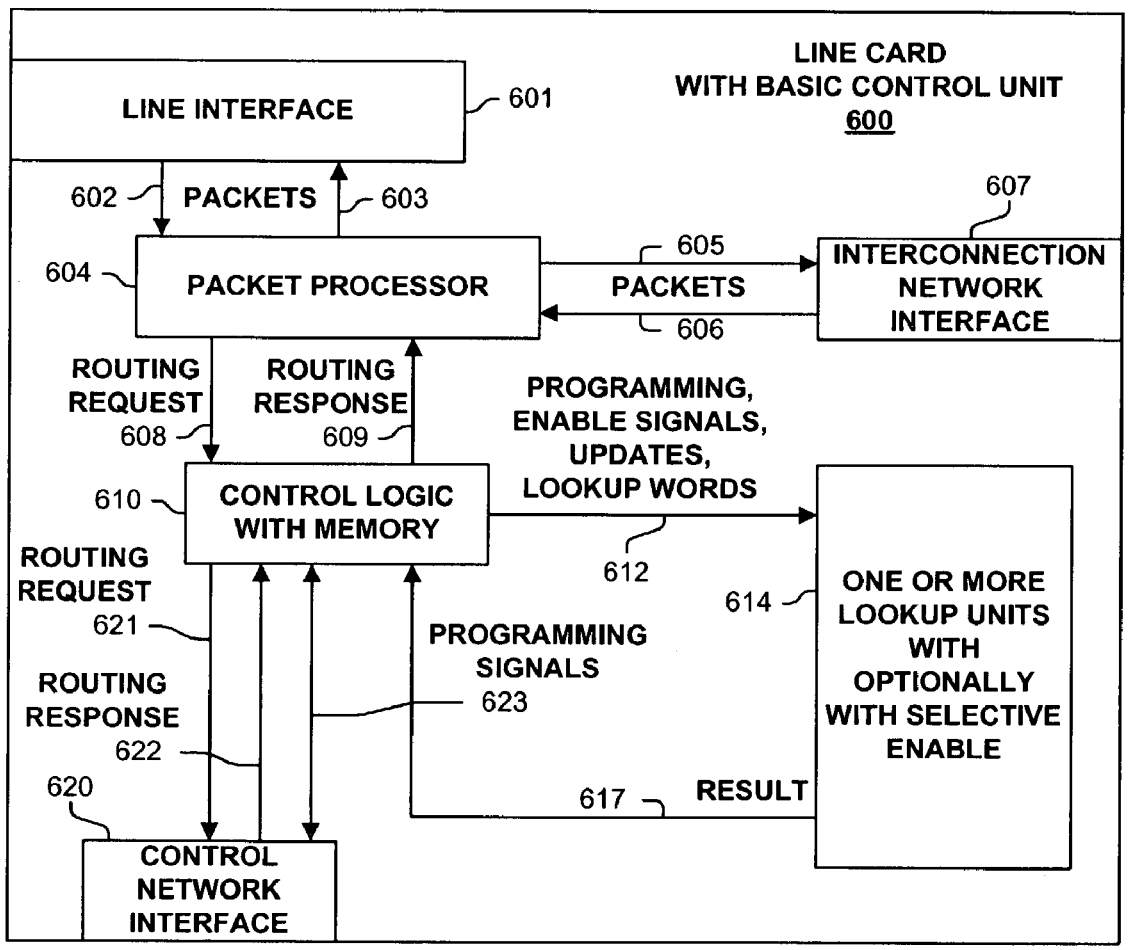
FIG. 6A illustrates a block diagram of basic control unit in a line card used in one embodiment.

FIG. 6A illustrates a block diagram of basic control unit in a line card 600 used in one embodiment. Control logic with memory 610 receives and optionally requests programming information (e.g. subsets of the routing space and corresponding routing indications) via programming signals 623 communicated to a supervisor control unit via control network interface 620. In response, control logic with memory 610 sends programming information and updates 612 to one or more lookup units 614.

Packets are received and transmitted by line interface 601 to external systems. Line interface communicates these packets 602 and 603 with packet processor 604. In response to receiving a packet 602, packet processor communicates a routing request 608 to control logic with memory 610, which determines how to route the packet 602. Control logic with memory 610 determines if it contains the necessary routing information. If so, a lookup operation is performed using one or more lookup units 614, optionally selectively enabling less than all of the one or more lookup units 614 (i.e., for those lookup units 614 having an enable input and enabling mechanism). A result 617 is produced, with result 617 typically identifying an action to be taken, such as a routing indication, and the packet is routed accordingly. Routing of packets 605 and 606 between line cards is typically performed using interconnection network interface 607, and via a directly connected link via line interface 601. Otherwise, if the subset of routing information is not currently maintained locally, a supervisor control unit is consulted or given the packet to handle.

In one embodiment, when a subset is not currently locally maintained, a routing request 621 is communicated to control network interface 620, which communicates the routing request to a supervisor control unit. Control network interface 620 receives a response from the supervisor control unit, and communicates response 622 to control logic with memory 610. In one embodiment, routing response 609 corresponds to a result 617 or routing response 622, and thus is communicated to packet processor 604 for use in routing or other manipulation of the packet. In one embodiment, response 622 includes a new subset corresponding to that required for routing the current packet, and thus, control logic with memory 610 updates one or more lookup units 614 via programming signals 612 with the new subset by adding the information or possibly replacing that of another subset. As the required subset is now programmed in one or more lookup units 614, a lookup operation is performed using one or more lookup units 614, optionally selectively enabling less than all of the one or more lookup units 614. A result 617 is produced, with result 617 typically identifying an action to be taken, such as a routing indication, and the packet is routed accordingly.

In one embodiment, when a subset is not currently locally maintained, the packet is forwarded by packet processor 604 via interconnection network interface 607 to a supervisor line card (which is guaranteed to have the required routing subset) for routing or otherwise handling the packet.

Figure 6B:
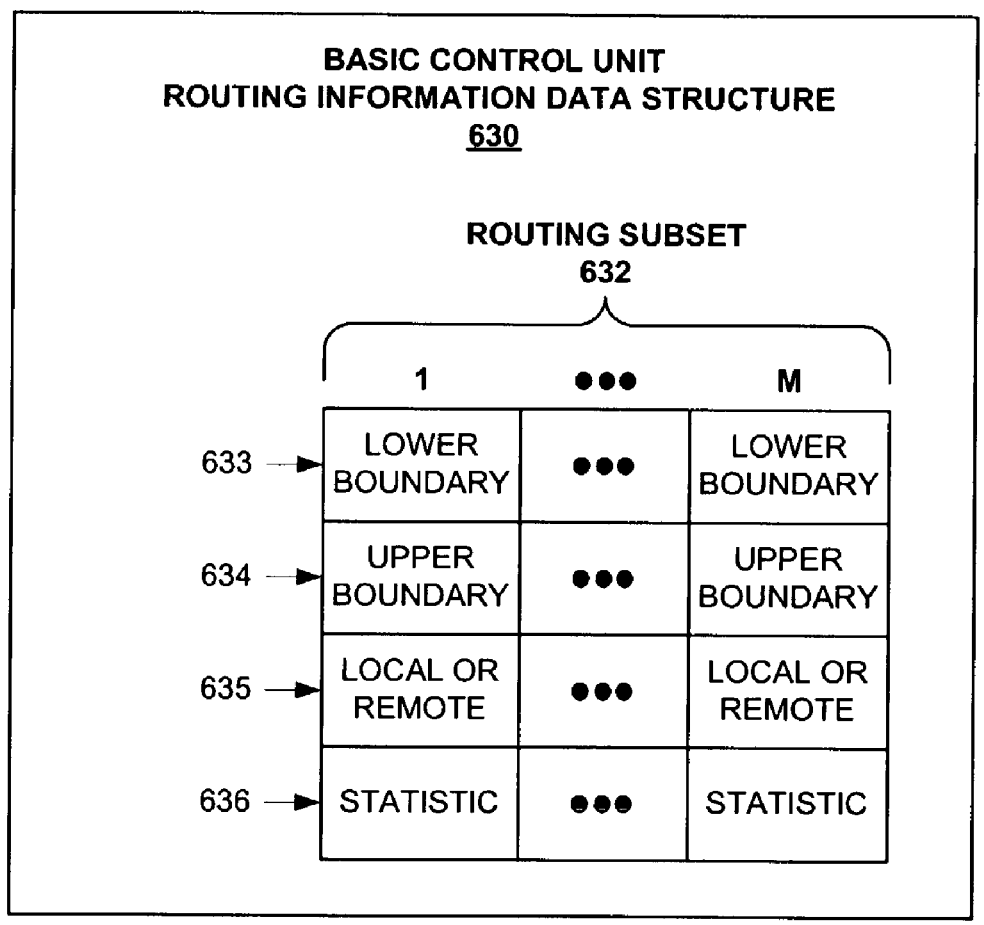
FIG. 6B illustrates a block diagram of a data structure used in one embodiment.

FIG. 6B illustrates a block diagram of a data structure 630 used in one embodiment for quickly identifying whether a particular subset of the routing information is maintained locally and for maintaining statistics on which subsets of information are accessed. Other embodiments may use different data structures and/or hardware comparators, counters, or other mechanisms for fast identification of which subsets are maintained locally and statistics corresponding to their use. One embodiment of a basic control unit does not collect statistics.

In one embodiment, data structure 630 includes an indication (e.g., value) of a lower boundary 633 and an upper boundary 634 for each routing subset 632, or at least those routing subsets maintained locally. As shown, the particular subset is identified by its entry location in data structure 630, while in one embodiment, each entry 632 includes a subset identifier value. If both local and only remotely maintained subsets are indicated in data structure 630, typically a local or remote indication field 635 is included. Based on these values, a routing subset for a particular routing lookup value (e.g., destination address) can be readily identified and determined if it is maintained locally or otherwise remotely. If statistics are collected, data structure 630 includes a statistics field 636 for maintaining a count or other indication of the use of the corresponding routing subset.

Figure 6C:
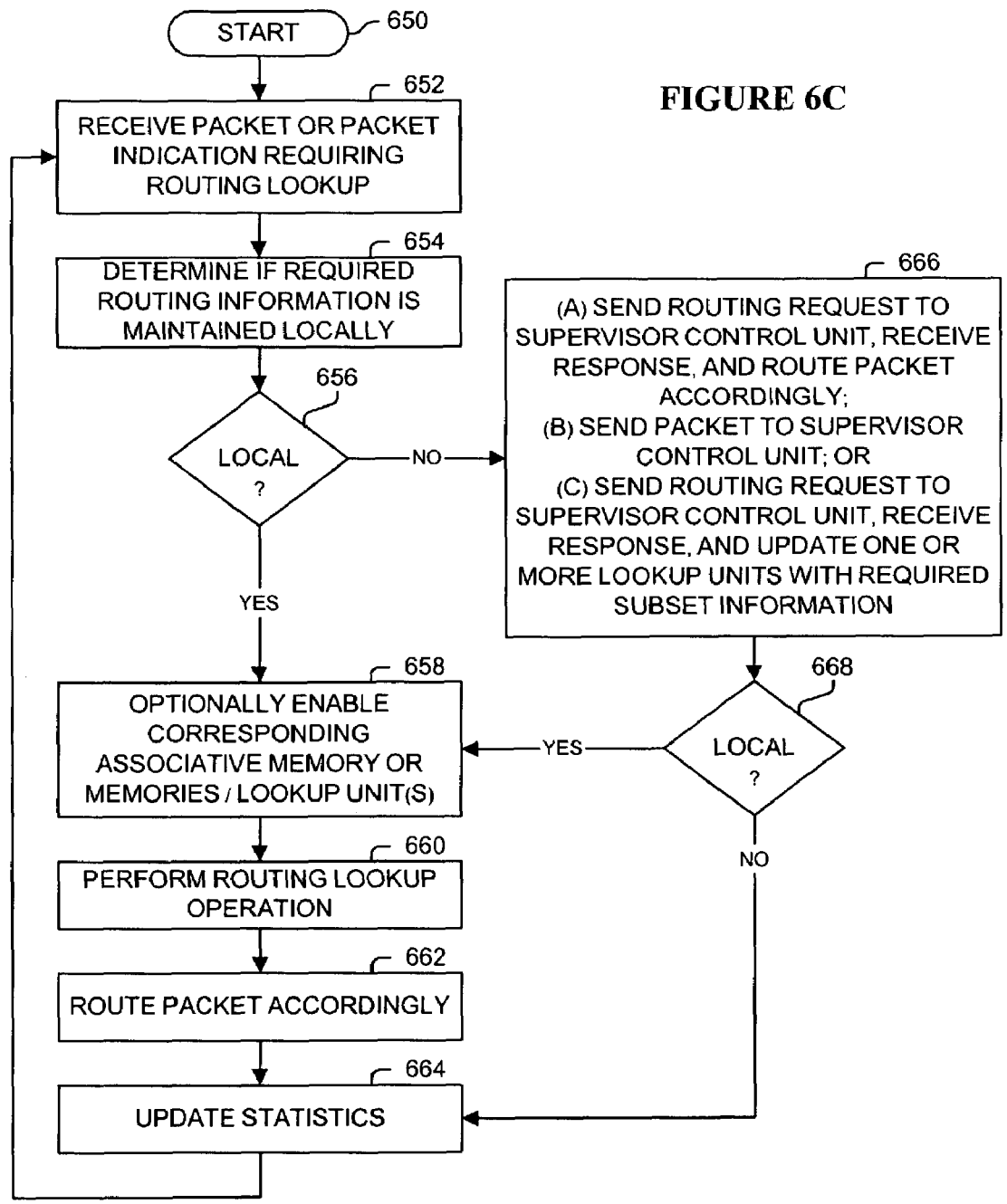
FIG. 6C illustrates a process for performing a lookup operation by a basic control unit used in one embodiment.

FIG. 6C illustrates a process for performing a lookup operation by a basic control unit used in one embodiment. Performing begins with process block 650, and proceeds to process block 652, wherein a packet or indication thereof is received which requires a routing lookup operation. Next, in process block 654, it is determined whether the routing information subset is stored locally or remotely, such as via hardware comparators or by accessing a data structure (such as that described in relation to FIGS. 4A and/or 3A-D.

As determined in process block 656, if the required routing information subset is not maintained locally, then, in process blocks 666 and 668, (a) a routing request is sent to a supervisor control unit, a routing response is received, the packet is processed accordingly, and processing proceeds to process block 664; (b) the packet is forwarded to a supervisor control unit for processing, and processing proceeds to process block 664; or (c) a routing request is sent to a supervisor control unit, a routing response is received, the local lookup unit is updated with the required routing subset information received in the routing response, and processing proceeds to process block 658.

In process block 658, corresponding one or more lookup units are optionally selectively enabled. In process block 660, a lookup operation is performed. In process block 662, the packet is routed accordingly, and statistics corresponding to the accesses routing information subset is updated in process block 664. Processing returns to process block 662.

Figure 6D:
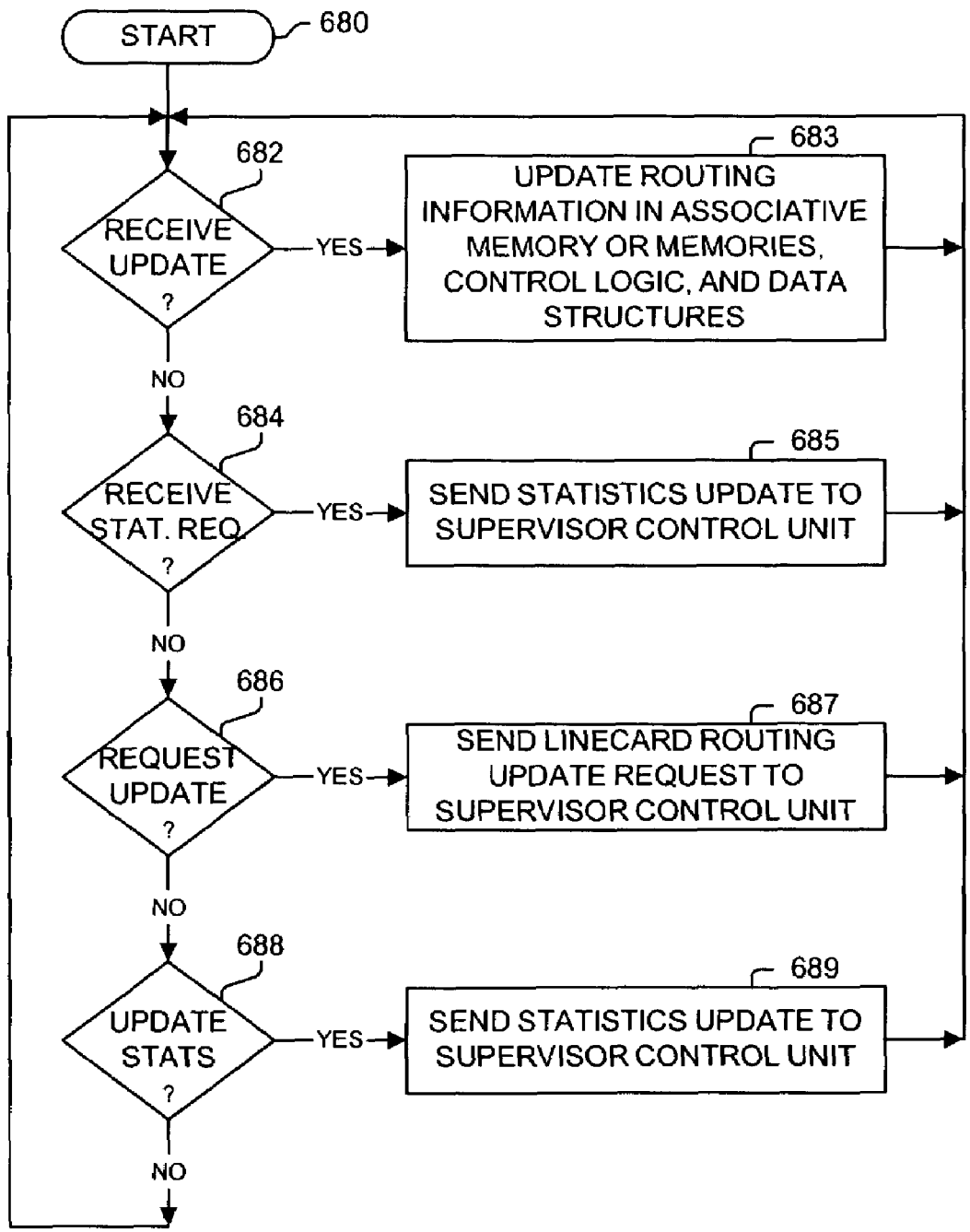
FIG. 6D illustrates a process for maintaining subsets of an information space by a basic control unit used in one embodiment.

FIG. 6D illustrates a process for maintaining subsets of an information space by a basic control unit used in one embodiment. Note, this process (and the corresponding process illustrated in FIG. 11D) as illustrated provides for uses a push and/or pull data programming/update mechanism, wherein one embodiment uses only a subset thereof. Processing begins with process block 680. As determined in process block 682, if an update (or initial programming) is received, then in process block 683, the routing information contained in the associative memory or memories, adjunct memory or memories, lookup unit(s), and location/statistics data structures are updated accordingly, which may include supplementing the stored subset information or replacing currently stored subset information with the newly received information. As determined in process block 684, if a request is received from a supervisor control unit for a statistics update, then in process block 685, statistics are collected from the data structure(s) or counters, etc., and forwarded to the supervisor control unit. As determined in process block 686, if this basic control unit determines, typically based on collected statistics on the traffic patterns identified with its use of the local or remotely stored routing information subsets, then in process block 687, a request is sent to the supervisor control unit for a new routing information subset, and possibly an indication of which routing information subset is no longer going to be maintained locally (such as when the new one is to replace an old one.) As determined in process block 688, if a statistics update message should be sent (e.g., in response to the expiration of some time or threshold being exceeded), then in process block 689, a message is sent to the supervisor control unit indicating the current values of the statistics locally collected. Processing returns to process block 682.

Figure 7A:
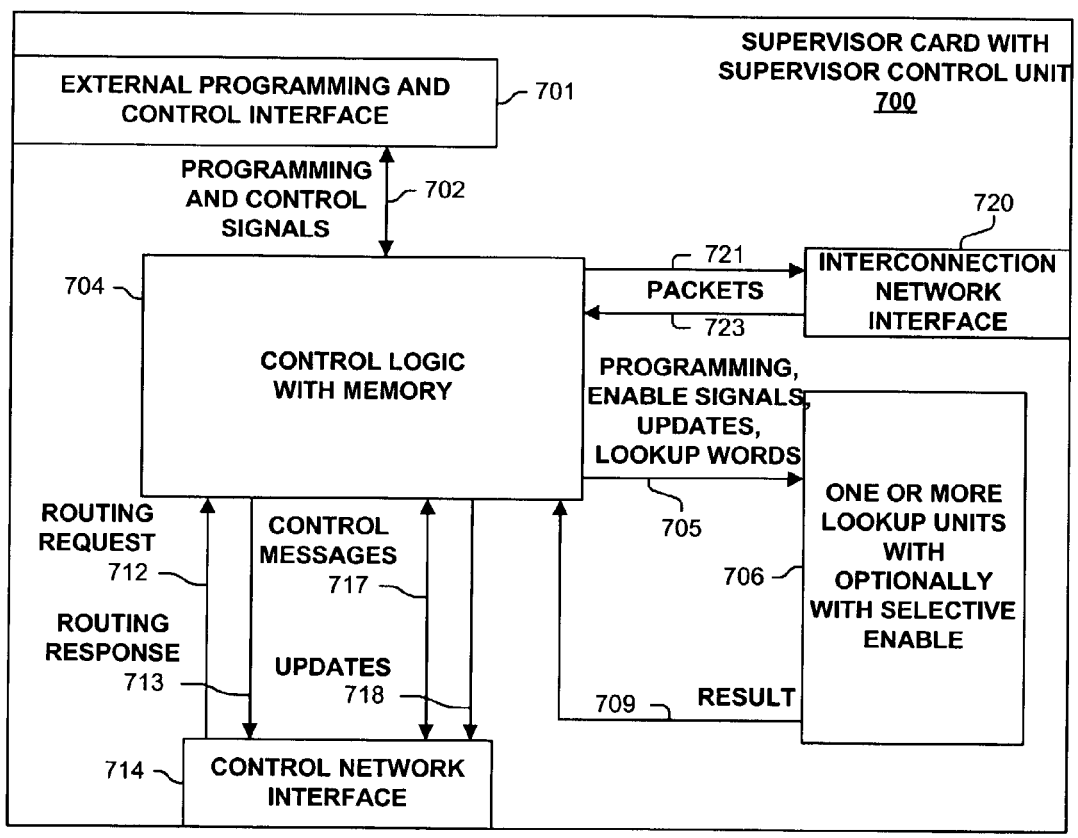
FIG. 7A illustrates a block diagram of a supervisor control unit in a supervisor card used in one embodiment.

FIG. 7A illustrates a block diagram of a supervisor control unit in a supervisor card 700 used in one embodiment. Programming information, including, but not limited to the routing information space is received via external programming and control interface 701, and communicated via signals 702 to control logic with memory 704. Control logic with memory typically partitions the received routing space into multiple routing information subsets. In one embodiment, this partitioning is performed external to supervisor card with supervisor control unit 700, such as by a general purpose or specialized computer (including a system 430 illustrated in FIG. 4B), and indications of this partitioning received via interface 701. In one embodiment, the partitioning of the routing information space (or other information space) is performed as described in relation to FIGS. 1A-C, 2A-B, and/or 3A-D.

Control logic with memory 704 programs one or more lookup units 706 via signals 705 with entries corresponding to the partitioned routing information space and corresponding routing indications (e.g., next hop information). Supervisor control unit 700 also programs one or more basic control units via update signals via control network interface 714, and communicates control information (e.g., statistic requests) via control messages 717 and updates 718.

In one embodiment, when a routing request 712 is received from a basic control unit, supervisor control unit 700 performs a lookup operation, and returns the resultant routing information in a routing response message 713 to the requesting basic control unit. In one embodiment, when a routing request 712 is received from a basic control unit, supervisor control unit returns a corresponding subset of the routing information in a routing response message 713 to the requesting basic control unit. In one embodiment, when a packet 723 is received via interconnection network interface 720 (typically from a basic control unit), supervisor control unit 700 performs a lookup operation, and routes the received packet (indicated by packets 721) to the corresponding basic control unit or other destination via interconnection network interface 720.

In one embodiment, control logic with memory generates a lookup word based on the received routing request 712, and communicates via signals 705 the lookup word and possibly selectively enabling less than all of the one or more lookup units 706 (i.e., for those lookup units 706 having an enable input and enabling mechanism). Routing result 709 (e.g., an indication of the routing action to take for the corresponding packet) is generated. Supervisor control unit then communicates the routing response 713 to the requesting basic control unit or uses the response in the routing of a packet.

Figure 7B:
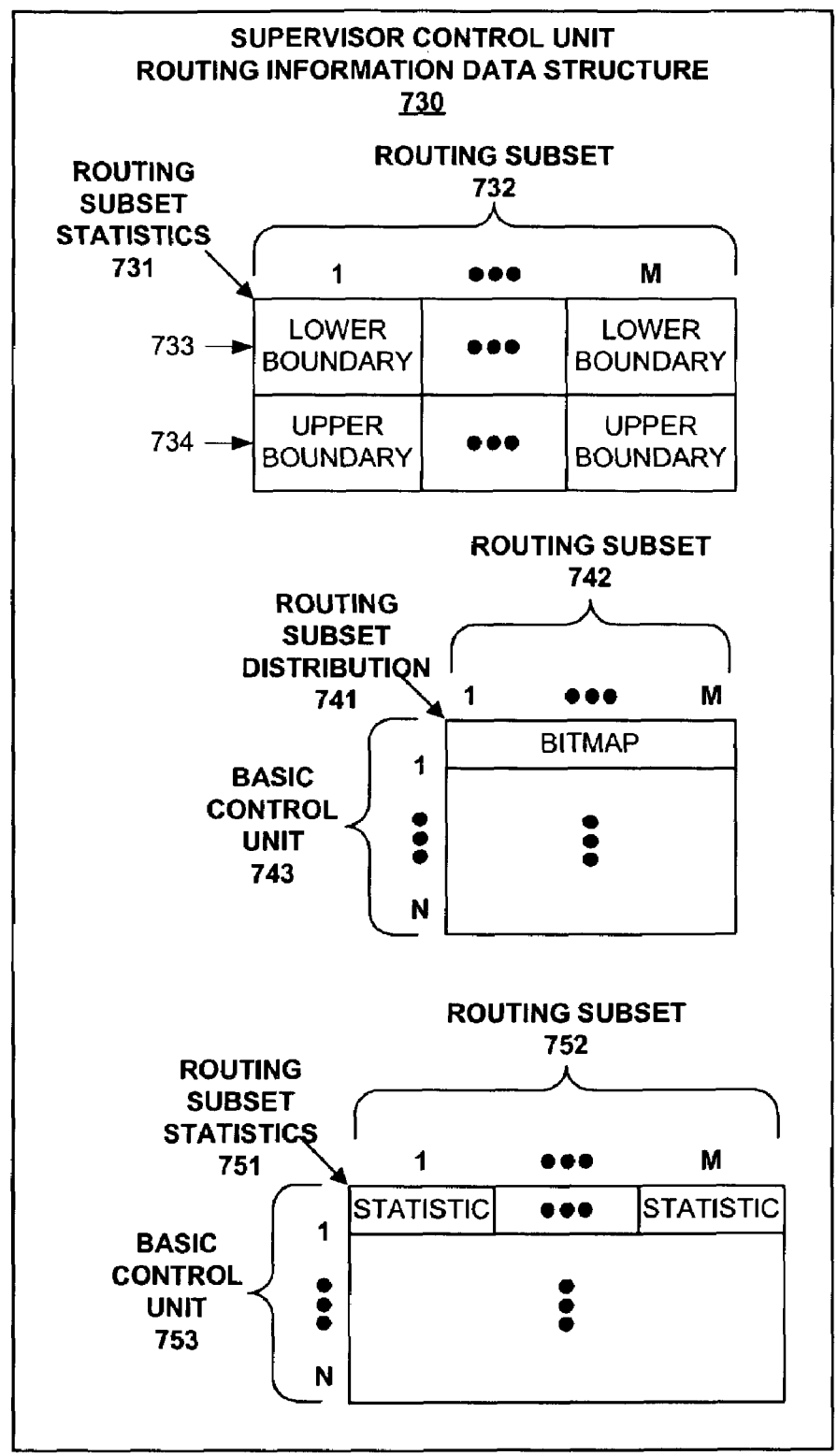
FIG. 7B illustrates a block diagram of a data structure used in one embodiment.

FIG. 7B illustrates a block diagram of a data structure 730 used in one embodiment. As shown, data structure 730 includes data structures 731, 741 and 751. In one embodiment, routing subset data structure 731 indicates the ranges of each of the routing subsets 732 using a lower boundary field 733 and an upper boundary field 734. As shown, the particular subset is identified by its entry location in data structure 730, while in one embodiment, each entry 732 includes a subset identifier value. In one embodiment, routing subset distribution data structure 741 indicates which routing subset 742 is stored locally by each basic control unit 743 using a bitmap or other data structure. In one embodiment, routing subset statistics data structure 751 is used to maintain statistics on the use of each routing subset 752 by the basic control units 753 typically by maintaining a count in each statistics field. In one embodiment, statistics are only collected based on routing lookup operations performed in the supervisor control unit, while in one embodiment, statistics are received from basic control units as to their use of one or more of the routing information subsets 752 so that a more complete routing picture can be captured, analyzed, and used to redistribute routing subsets or update the partitioning of the information space into the subsets.

Figure 7C:
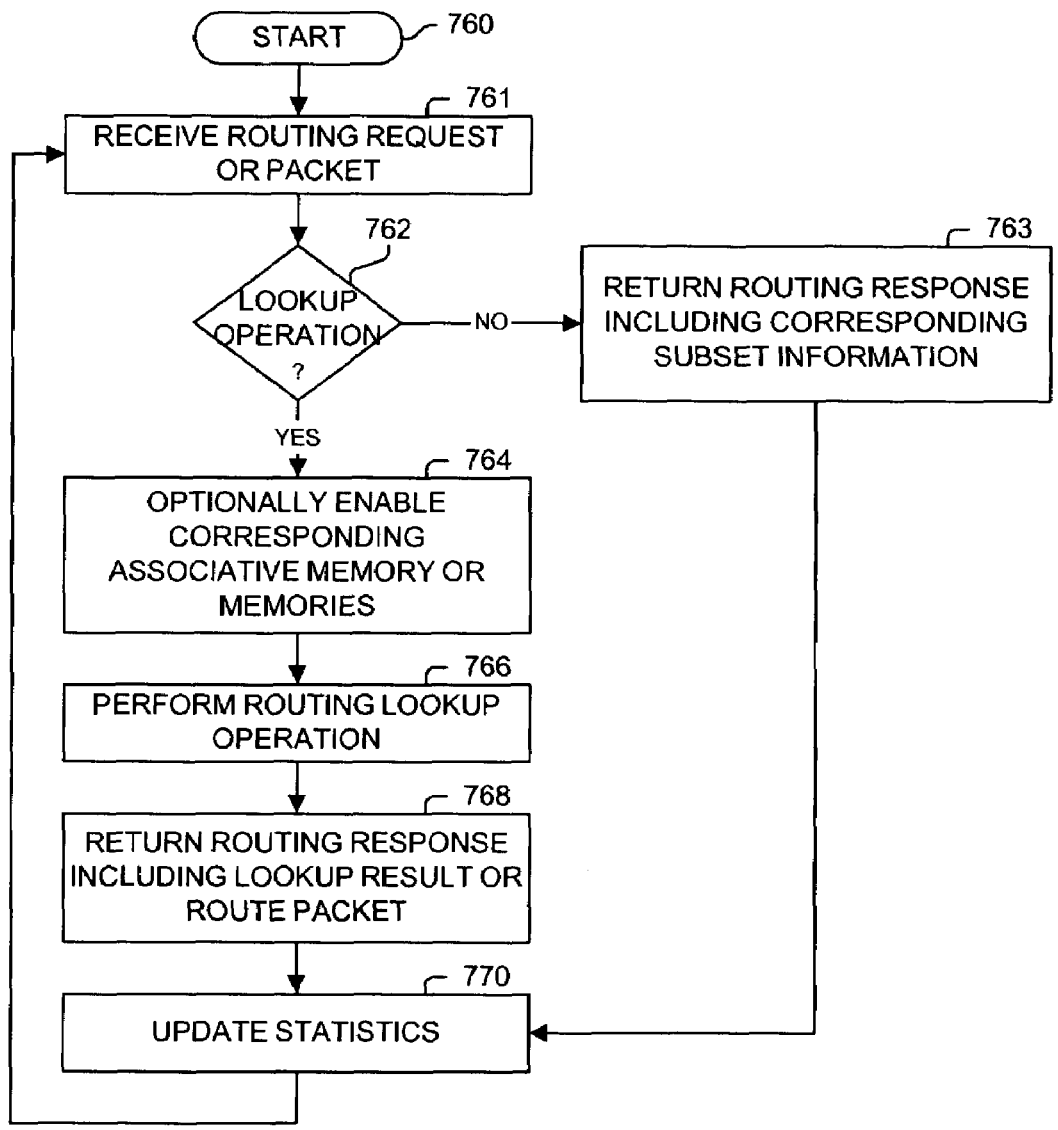
FIG. 7C illustrates a process for performing a lookup operation by a supervisor control unit used in one embodiment.

FIG. 7C illustrates a process for performing a lookup operation by a supervisor control unit used in one embodiment. Processing begins with process block 760, and proceeds to process block 761, wherein a routing request or packet is received from one of the basic control units. As determined in process block 762, if a lookup operation is not to be performed (e.g., a new subset is to be sent), then in process block 763, a routing response including the required routing subset is returned to the requesting basic control unit, and processing proceeds to process block 770. Otherwise, in process block 764, optionally, less than all of the associative memories/lookup units are enabled. In process block 766, the lookup operation is performed based on the routing request or received packet. In process block 768, the routing response is communicated to the requesting basic control unit or the packet is routed. In process block 770, the statistic corresponding to the accessed routing information subset is updated. Processing returns to process block 761.

Figure 7D:
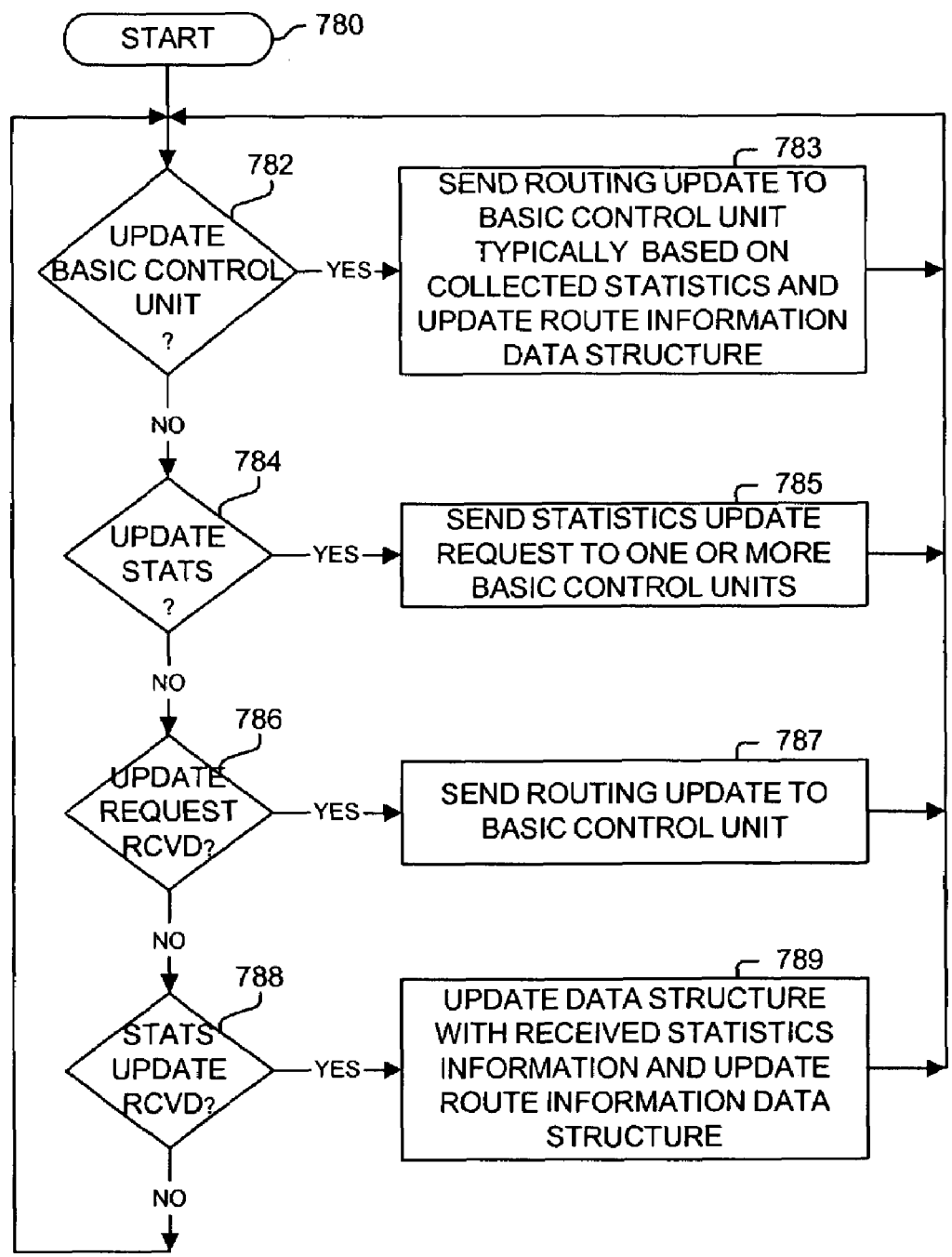
FIG. 7D illustrates a process for distributing subsets of an information space by a supervisor control unit used in one embodiment.

FIG. 7D illustrates a process used in one embodiment for distributing subsets of an information space by a supervisor control unit and for collecting statistics from basic control units. Processing begins with process block 780. As determined in process block 782, if a basic control unit should be updated with one or more particular subsets of the routing information space, such as in response to analyzing the collected statistics, then in process block 783, a routing update is sent to the corresponding basic control unit and the supervisor control unit updates its routing information data structure. As determined in process block 784, if statistics should be collected from one or more of the basic control units, then corresponding request messages are sent in process block 785. As determined in process block 786, if an update request has been received from a basic control unit, then in process block 787, a routing update is sent to the corresponding basic control unit and the supervisor control unit updates its routing information data structure. As determined in process block 788, if statistics update information has been received, then in process block 789, the supervisor control unit updates its routing information data structure. Processing returns to process block 780.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for routing or manipulating packets or other information, the apparatus comprising:
   one or more basic control units each including control logic and one or more first lookup units; and
   a supervisor control unit including control logic and a memory, the supervisor control unit coupled to each of said one or more basic control units;
   wherein the supervisor control unit is configured to maintain routing information, to partition said routing information into a plurality of routing information subsets such that for a particular prefix in a particular routing information subset, the particular routing information subset includes all longer prefixes beginning with said particular prefix in said routing information, and to distribute routing information subsets to said one or more basic control units; and
   wherein each of the one or more basic control units is configured to receive said routing information subsets, to populate its one or more first lookup units with said received routing information subsets, and to perform lookup operations in its one or more first lookup units to generate a result based on a route identifier; and
   wherein said partitioning the routing information includes deriving a Patricia tree representation of the routing information; and wherein the supervisor control unit is configured to repartition the routing information among the plurality of routing information subsets, said repartitioning including modifying a boundary between a first and a second subsets of the plurality of routing information subsets.

2. The apparatus of claim 1,
   wherein the supervisor control unit includes one or more second lookup units;
   wherein each of the one or more basic control units is configured to communicate a routing request to the supervisor control unit when its one or more first lookup units do not include the routing information subset corresponding to the route identifier;
   wherein the supervisor control unit is configured to receive routing requests from the one or more basic control units and to perform lookup operations on said routing information in the one or more second lookup units based on said received routing requests.

3. The apparatus of claim 2, wherein less than all of said one or more second lookup units are selectively enabled when performing a particular lookup operation on said routing information in the one or more second lookup units.

4. The apparatus of claim 1, wherein a particular packet includes the route identifier;
   wherein the supervisor control unit includes one or more second lookup units;
   wherein each of the one or more basic control units is configured to communicate the particular packet to the supervisor control unit when its one or more first lookup units do not include the routing information subset corresponding to the route identifier;
   wherein the supervisor control unit is configured to receive the particular packet and to perform lookup operation on the route identifier in the one or more second lookup units based on said received routing requests.

5. The apparatus of claim 4, wherein less than all of said one or more second lookup units are selectively enabled when performing said lookup operation on the route identifier in the one or more second lookup units.

6. The apparatus of claim 1, wherein less than all of said one or more first lookup units are selectively enabled when performing a particular lookup operation in its one or more first lookup units.

7. The apparatus of claim 1, comprising a supervisor line card including the supervisor control unit; and a plurality of line cards, each of the plurality of line cards including a different one of the one or more basic control units.

8. The apparatus of claim 1; wherein the first subset is left of the second subset in a Patricia tree representation, and wherein said adjusting the boundary includes determining a prefix left of the second subset and setting the boundary to the prefix supplemented with ones.

9. The apparatus of claim 1, wherein the first subset is left of the second subset in a Patricia tree representation, and wherein said adjusting the boundary includes determining a prefix right of the first subset and setting the boundary to the prefix supplemented with zeros.

10. An apparatus for routing or manipulating packets or other information based on a route identifier, the apparatus comprising:
    a plurality of basic control units; and
    a supervisor control unit, coupled to each of the said basic control units;
    wherein the supervisor control unit includes:
       means for partitioning a routing space into a plurality of routing information subsets such that for a particular prefix in a particular routing information subset, the particular routing information subset includes all longer prefixes beginning with said particular prefix in said routing information; and
       means for distributing less than all of the plurality of routing information subsets to each of the said basic control units such that at least two of said basic control units are said distributed different subsets of said routing information subsets; and
    wherein each of the one or more basic control units includes:
       means for receiving said routing information subsets; and
       means for determining a result based on the route identifier;
    wherein said supervisor control unit is configured to provide additional one or more subsets of said routing information subsets to each particular basic control unit of said basic control units based on the routing requirements during operation of said particular basic control unit.

11. The apparatus of claim 10, wherein the supervisor control unit includes means for collecting statistics from said basic control units; and wherein the supervisor control unit is configured to said provide additional one or more subsets of said routing information subsets to said basic control units in response to said statistics.

12. The apparatus of claim 10, wherein said means for partitioning the routing space includes means for deriving a Patricia tree representation including plurality of routing information subsets.

13. The apparatus of claim 10, wherein said means for determining the result based on the route identifier includes:
means for sending a request to the supervisor control unit; and
means for receiving the result from the supervisor control unit.

14. The apparatus of claim 13, wherein the supervisor control unit includes:
means for receiving the request;
means for determining the result based on the request; and
means for communicating the request to a particular basic control unit of said one or more basic control units.

15. The apparatus of claim 10, wherein said means for determining the result based on the route identifier includes means for forwarding a particular packet to the supervisor control unit.

16. The apparatus of claim 10, wherein the supervisor control unit is configured to repartition the routing space among the plurality of routing information subsets.

17. The apparatus of claim 16, wherein said repartitioning including modifying a boundary between a first and a second subsets of the plurality of routing information subsets.

18. A method for routing or manipulating packets or other information, the method comprising:
partitioning an information space into a plurality of information subsets such that for a particular prefix in a particular information subset, the particular information subset includes all longer prefixes beginning with said particular prefix in the information space;
distributing less than all of the plurality of information subsets to each of a plurality of basic control units such that at least two of said basic control units are said distributed different subsets of said routing information subsets;
performing a lookup operation in a particular one of said one or more basic control units based on a first identifier to identify a first result;
manipulating a first set of information based on the first result; and
providing additional one or more subsets of said information subsets to each particular basic control unit of said basic control units based on the requirements during operation of said particular basic control unit.

19. The method of claim 18, including providing the particular one of said one or more basic control units an additional information subset of the plurality of information subsets.

20. The method of claim 18, wherein said partitioning the information space includes deriving a Patricia tree representation including the plurality of information subsets.

21. The method of claim 18, further comprising:
the particular one of said one or more basic control units identifying a second identifier;
the particular one of said one or more basic control units determining that an information subset corresponding to the second identifier is not stored within the particular one of said one or more basic control units;
the particular one of said one or more basic control units sending a request to a control unit;
the control unit returning a response to the particular one of said one or more basic control units; and
the particular one of said one or more basic control units manipulating a second set of information based on the second result.

22. The method of claim 18, further comprising:
the particular one of said one or more basic control units identifying a second identifier;
the particular one of said one or more basic control units determining that an information subset corresponding to the second identifier is not stored within the particular one of said one or more basic control units;
the particular one of said one or more basic control units sending a request to process the second to a control unit;
the control unit performing a lookup operation based on the second identifier to generate a second result; and
the control unit manipulating a second set of information based on the second result.

23. The method of claim 18, comprising: repartitioning the information among the plurality of information subsets.

24. The method of claim 23, wherein said repartitioning including modifying a boundary between a first and a second subsets of the plurality of information subsets.

* * * * *